United States Patent
Niroumand et al.

(10) Patent No.: US 10,854,902 B2
(45) Date of Patent: Dec. 1, 2020

(54) SYSTEMS AND METHODS FOR ACQUISITION, PARAMETERIZATION, AND VALIDATION OF FUEL CELL POLARIZATION DATA

(71) Applicant: Greenlight Innovation Corporation, Burnaby (CA)

(72) Inventors: Amir Masoud Niroumand, Agassiz (CA); Michael Hermann Eikerling, Vancouver (CA); Mark Randall Olfert, Delta (CA); Motahareh Safiollah, Coquitlam (CA)

(73) Assignee: GREENLIGHT INNOVATION CORPORATION, Burnaby (CA)

(*) Notice: Subject to any disclaimer, the term of this patent is extended or adjusted under 35 U.S.C. 154(b) by 98 days.

(21) Appl. No.: 16/211,710

(22) Filed: Dec. 6, 2018

(65) Prior Publication Data

US 2019/0190048 A1    Jun. 20, 2019

Related U.S. Application Data

(63) Continuation of application No. 15/202,432, filed on Jul. 5, 2016, now abandoned.

(60) Provisional application No. 62/187,914, filed on Jul. 2, 2015.

(51) Int. Cl.
*H01M 8/04992* (2016.01)
*H01M 8/04537* (2016.01)

(52) U.S. Cl.
CPC ... *H01M 8/04992* (2013.01); *H01M 8/04544* (2013.01); *H01M 8/04574* (2013.01); *H01M 8/04641* (2013.01)

(58) Field of Classification Search
CPC ......... H01M 8/04544; H01M 8/04574; H01M 8/04641; H01M 8/04992
See application file for complete search history.

(56) References Cited

U.S. PATENT DOCUMENTS

| | | |
|---|---|---|
| 6,889,147 B2 | 5/2005 | Gopal et al. |
| 7,124,040 B2 | 10/2006 | Engelhardt et al. |
| 7,194,367 B2 | 3/2007 | Baker |
| 7,879,502 B2 | 12/2011 | Lienkamp et al. |
| 8,214,174 B2 | 7/2012 | Ganapathy et al. |
| 2002/0051899 A1 | 5/2002 | Keskula et al. |
| 2004/0245100 A1 | 12/2004 | Abouatallah |
| 2006/0051628 A1 | 3/2006 | Lim et al. |
| 2006/0115693 A1 | 6/2006 | Toth et al. |
| 2014/0239962 A1 | 8/2014 | Oda et al. |

OTHER PUBLICATIONS

M. Baghalha et al., "Model-Based Deconvolution of Potential Losses in a PEM Fuel Cell", ECS Trans. 2010 28(23): 159-167.
M. Eikerling and A.A. Kornyshev, "Modelling the Performance of the Cathode Catalyst Layer of Polymer Electrolyte Fuel Cells", J. Electroanal. Chem. 453, 89-106 (1998).
J. Kim et al., "Modeling of proton exchange membrane fuel cell performance with an empirical equation", Journal of the Electrochemical Society, v 142, n 8, p. 2670-2674,1995.
J. Niemann, "Unraveling Fuel Cell Electrical Measurements", Dec. 2004 (http://www.tek.com/sites/tek.com/files/media/document/resources/2581%20Fuel%20Cell.pdf).
H. Yu et al., "Transient Behavior of a Proton Exchange Membrane Fuel Cell under Dry Operation", Journal of The Electrochemical Society, 153 (3) A570-A575 (2006 ).
A.K Manohar et al., "The polarization behavior of the anode in a microbial fuel cell", Electrochimica Acta 53 (2008) 3508-3513.
Polymer Electrolyte Fuel Cells: Physical Principles of Materials and Operation by Michael Eikerling, Andrei Kulikovsky, CRC Press; Sep. 23, 2014, (Book) pp. 389-402.
Fuel Cell Science and Engineering: Materials, Processes, Systems and Technology, Detlef Stolten Bernd Emonts, Oct. 22, 2012 John Wiley & Sons (Book) pp. 152-153—can be found at the following link: https://books.google.ca/books?id=EzXQ0UuHUb0C&pg=PA153&lpg=PA153&dq=fuel+cell+polarization+curve+potentiostatic+control&source=bl&ots=TmtZa1C3IX&sig=1vw9B1NOTgTivJga5EhLhwZDy2U&hl=en&sa=X&ved=0CEcQ6AEwBmoVChMI1Myk_GSxgIVSS6ICh05CA9q#v=onepage&q=fuel%20cell%20polarization%20curve%20potentiostatic%20control&f=false.
PEM Fuel Cell Testing and Diagnosis, Jiujun Zhang Jifeng Wu Huamin Zhang, Jan. 22, 2013(Book) pp. 82-83—can be found at the following link: https://books.google.ca/books?id=f9nuNKYz0JgC&pg=PA83&lpg=PA83&dq=fuel+cell+polarization+voltage-controlled&source=bl&ots=6h4mBQE3j2&sig=dLhHno1IBmrRhNaPcr1MnAtUAPQ&hl=en&sa=X&ved=0CC0Q6AEwAmoVChMItbzqvOySxgIV1S-ICh052APJ#v=onepage&q=fuel%20cell%20polarization%20voltage-controlled&f=false.

*Primary Examiner* — Carlos Barcena
(74) *Attorney, Agent, or Firm* — Clark & Brody LP

(57) ABSTRACT

Methods, systems, and techniques are provided for acquiring fuel cell polarization data, obtaining fuel cell polarization parameters from the fuel cell polarization data, and validating the reliability of the obtained data and parameters. In some aspects methods for acquiring and parameterizing proton exchange membrane fuel cell polarization data include measuring at least one current-voltage point for an operating fuel cell, and determining at least one polarization parameter of the fuel cell by evaluating a closed form solution using the at least one current-voltage point.

18 Claims, 10 Drawing Sheets

SYSTEMS AND METHODS FOR ACQUISITION, PARAMETERIZATION, AND VALIDATION OF FUEL CELL POLARIZATION DATA

CROSS-REFERENCE TO RELATED APPLICATIONS

This application is a Continuation of U.S. Ser. No. 15/202,432 filed on Jul. 5, 2016, which claims priority benefits from U.S. provisional patent application No. 62/187,914 filed on Jul. 2, 2015, entitled "Method for Acquisition and Parameterization of a Fuel Cell Polarization Curve". The '914 and '432 applications are hereby incorporated by reference herein in its entirety.

FIELD OF THE INVENTION

The present invention relates to methods, systems, and techniques for acquiring fuel cell polarization data, obtaining fuel cell polarization parameters from the fuel cell polarization data, and validating the reliability of the obtained data and parameters.

BACKGROUND OF THE INVENTION

Analysis of the fuel cell polarization curve is a practical method for characterizing the performance of a fuel cell assembly (such as a single fuel cell or fuel cell stack), and understanding various sources of potential losses. Studies of polarization curves allow the performance of fuel cells with different configurations, components, materials and operating conditions to be compared. Furthermore, careful model-based analysis of fuel cell polarization curves enables deconvolution of different voltage loss mechanisms and determination of the corresponding parameters. With this information, structural properties and dynamic processes that give rise to performance variations can be analyzed further, guiding more detailed studies of structure versus property relationships, which is important for improving fuel cell design. As such, the polarization curve remains an important tool for characterizing polymer electrolyte membrane (PEM) fuel cells.

Procedures for obtaining fuel cell polarization data for fuel cell assembly generally involve changing the fuel cell current and measuring the voltage (so called "current-control" mode), or changing the fuel cell voltage and measuring the current (so called voltage-control" mode).

A typical fuel cell polarization curve 100 is shown in FIG. 1. The curve exhibits three distinct regions: a low current density region 120, a medium current density region 140 and a high current density region 160. Dashed line 130 indicates a boundary between the low and medium current density regions 120 and 140, respectively, and dashed line 150 indicates a boundary between the medium and high current density regions 140 and 160, respectively. The boundaries are not precisely defined. In the low current density region, activation losses from the electro-catalytic processes in the catalyst layers dominate the behavior. In the medium current density region, ohmic losses become significant and add to the activation losses. In the high current density region, mass transport limitations in the porous media of the fuel cell tend to cause substantially reduced reactant concentrations in the catalyst layer, which increases the catalytic losses. Therefore, mass transport losses dominate in this region.

There is significant curvature in the low and high current density regions 120 and 160, while the medium current density region 140 exhibits quasi-linear behavior. Therefore, in order to capture the shape of the polarization curve, more data points are required at the low and high current density regions, while the medium current density region could be adequately determined using less closely spaced data points, or even with as few as only two data points. However, a difficulty is that the currents or current densities at which the boundaries between the three regions occur are not known prior to testing. Therefore, during acquisition of fuel cell polarization data, measurements are typically recorded at densely spaced data points to ensure that the polarization curve is properly captured in all three regions, and that a subsequent curve fit will result in accurate determination of polarization parameters. Therefore, obtaining a fuel cell polarization data tends to be a relatively lengthy and costly experimental procedure. For example, the US Department of Energy (DOE) polarization algorithm proposes a 15 minute wait at each data point, with some 10 data points to test a PEM fuel cell with a maximum current of 2100 $mA/cm^2$, resulting in 2.5 hour process to obtain a polarization curve.

Once the fuel polarization data has been obtained, the resulting current-voltage data is typically fitted to an empirical polarization equation in order to obtain various polarization parameters. More sophisticated fitting approaches, for example, based on accurate physical models of catalyst layer operation are also now available.

SUMMARY OF THE INVENTION

A method for acquiring and parameterizing proton exchange membrane fuel cell polarization data includes:
controlling operation of a fuel cell at an initial cathode pressure and, while the fuel cell is operating at the initial cathode pressure, determining at least one voltage and corresponding current density; and
determining, by a processor, at least one polarization parameter of the fuel cell using the at least one voltage and corresponding current density, for example, by using a closed form solution or solving equations.

In some aspects, a method for acquiring and parameterizing proton exchange membrane fuel cell polarization data in a low current density region includes:
controlling operation of the fuel cell in a low current density region of a fuel cell polarization curve and, while the fuel cell is operating in the low current density region, determining an open circuit voltage, a first voltage and corresponding first current density, and a second voltage and corresponding second current density; and
determining, by a processor, at least one polarization parameter using the open circuit voltage, the first voltage and corresponding first current density, and the second voltage and corresponding second current density, for example by using a closed form solution or solving equations.

The polarization parameters of the fuel cell that are determined can include Tafel slope, permeation current density, and exchange current density.

In some embodiments, the method includes determining the permeation current density, then determining the Tafel slope using the permeation current density, and then determining the exchange current density using the Tafel slope and the permeation current density.

In some embodiments, the permeation current density is determined using the open circuit voltage, the first voltage and corresponding first current density, and the second voltage and corresponding second current density. For example, the processor can determine permeation current density includes using:

$$(i_1 - i_P)^a - i_P^a - i_2 i_P^{a-1} = 0;\ a = \frac{V_2 - V_{oc}}{V_1 - V_{oc}}$$

wherein $i_p$ is the permeation current density, $i_1$ and $i_2$ are the first and second current densities, respectively, $V_{OC}$ is the open circuit voltage, and $V_1$ and $V_2$ are the first and second voltages, respectively.

In some embodiments, determining Tafel slope includes using either the first voltage and corresponding first current density, or the second voltage and corresponding second current density, and using the open circuit voltage and the permeation current density. For example, the processor can determine the Tafel slope using:

$$V = V_{oc} - A\ln\left(1 + \frac{i}{i_P}\right)$$

wherein V and i are the first voltage and current density or the second voltage and current density, $V_{OC}$ is the open circuit voltage, $i_p$ is the permeation current density, and A is the Tafel slope.

In some embodiments, the method includes determining the exchange current density using the permeation current density, the open circuit voltage, an equilibrium voltage of the fuel cell, and the Tafel slope. For example, the processor can determine exchange current density using:

$$i_0 = i_P e^{\frac{V_{oc} - V_{eq}}{A}}$$

wherein $i_0$ is the exchange current density, $V_{eq}$ is the equilibrium voltage, $V_{OC}$ is the open circuit voltage, $i_p$ is the permeation current density, and A is the Tafel slope.

In some aspects, a method for acquiring and parameterizing proton exchange membrane fuel cell polarization data in a medium current density region includes:

controlling operation of a fuel cell in a medium current density region of a fuel cell polarization curve and, while the fuel cell is operating in the medium current density region, determining an open circuit voltage, a voltage and corresponding current density; and determining, by a processor, cell resistance of the fuel cell using the open circuit voltage, the voltage and corresponding current density, an equilibrium voltage of the fuel cell, a permeation current density of the fuel cell, an exchange current density of the fuel cell, and a Tafel slope of the fuel cell, for example, by using a closed form solution or solving equations.

The processor can determines the cell resistance using:

$$r = \frac{V_{eq} - V - A\ln\left(\frac{i + i_P}{i_0}\right)}{i}$$

wherein r is the cell resistance, $V_{eq}$ is the equilibrium voltage, V and i are the voltage and current density, respectively, $i_0$ is the exchange current density, A is the Tafel slope, and $i_p$ is the permeation current density.

In some aspects, as well as acquiring and parameterizing fuel cell polarization data in a low current density region as described above, method further includes:

controlling operation of the fuel cell in a medium current density region of a fuel cell polarization curve and, while the fuel cell is operating in the medium current density region, determining a third voltage and corresponding third current density; and determining, by a processor, cell resistance of the fuel cell using the open circuit voltage, the third voltage and third current density, an equilibrium voltage of the fuel cell, the permeation current density, the exchange current density, and the Tafel slope, for example, by using a closed form solution or solving equations.

In some embodiments, the processor evaluates a closed form solution to determine each of the permeation current density, exchange current density, and Tafel slope.

In some embodiments, the processor determines the cell resistance using:

$$r = \frac{V_{eq} - V_3 - A\ln\left(\frac{i_3 + i_P}{i_0}\right)}{i_3}$$

wherein r is the cell resistance, $V_{eq}$ is the equilibrium voltage, $V_3$ and $i_3$ are the third voltage and current density, respectively, $i_0$ is the exchange current density, A is the Tafel slope, and $i_p$ is the permeation current density.

In some embodiments, the processor determines:
the permeation current density using $$(i_1 - i_P)^a - i_P^a - i_2 i_P^{a-1} = 0;\ a = \frac{V_2 - V_{oc}}{V_1 - V_{oc}}$$

wherein $i_p$ is the permeation current density, $i_1$ and $i_2$ are the first and second current densities, respectively, $V_{OC}$ is the open circuit voltage, and $V_1$ and $V_2$ are the first and second voltages, respectively, the Tafel slope using:

$$V = V_{oc} - A\ln\left(1 + \frac{i}{i_P}\right)$$

wherein V and i are the first voltage and current density or the second voltage and current density, and A is the Tafel slope, and the exchange current density using:

$$i_0 = i_P e^{\frac{V_{oc} - V_{eq}}{A}}$$

wherein $i_0$ is the exchange current density and $V_{eq}$ is an equilibrium voltage of the fuel cell.

Embodiments of methods described above can optionally further include iteratively re-determining, by the processor, the permeation current density, Tafel slope, exchange current density, and cell resistance, until the permeation current density, Tafel slope, exchange current density, and cell resistance each converges. The processor re-determines the permeation current density for a current iteration using a closed form solution including the cell resistance, the open circuit voltage, and the first and second voltages and current densities from a previous iteration. In some embodiments, the processor re-determines the permeation current density using:

$$(i_1 - i_P)^a - i_P^a - i_2 i_P^{a-1} = 0$$
$$a = \frac{V_2 + ri_2 - V_{oc}}{V_1 + ri_1 - V_{oc}}$$

wherein $i_p$ is the permeation current density, $i_1$ and $i_2$ are the first and second current densities, respectively, $V_{OC}$ is the open circuit voltage, and $V_1$ and $V_2$ are the first and second voltages, respectively, and r is the cell resistance.

In some embodiments, the method can further include:
controlling operation of the fuel cell at a secondary cathode pressure and in the low current density region; and
while the fuel cell is operating at the secondary cathode pressure in the low current density region, re-determining, by the processor, the permeation current density, Tafel slope, exchange current density, and cell resistance at the secondary cathode pressure.

Optionally this method, further includes iteratively re-determining, by the processor, the permeation current density, Tafel slope, exchange current density, and cell resistance for the secondary cathode pressure until the permeation current density, Tafel slope, exchange current density, and cell resistance for the secondary cathode pressure each converges. The processor can re-determine the permeation current density for the secondary cathode pressure for a current iteration using a closed form solution including the cell resistance, the open circuit voltage, and the first and second voltages and current densities for the secondary cathode pressure from a previous iteration.

A reaction order can be determined by the processor, using the initial and secondary cathode pressures and the exchange current densities at the initial and secondary cathode pressures. For example, the processor can determine the reaction order using:

$$\gamma = \frac{\ln\left(\frac{i_0^*}{i_0}\right)}{\ln\left(\frac{P^*}{P_0}\right)}$$

wherein $\gamma$ is the reaction order, $P_0$ is the initial cathode pressure, $P^*$ is the secondary cathode pressure, $i_0$ is the exchange current density at $P_0$, and $i_0^*$ is the exchange current density at $P^*$.

In another aspect, a method for acquiring and parameterizing proton exchange membrane fuel cell polarization data in a high current density region includes:
controlling operation of a fuel cell in a high current density region of a fuel cell polarization curve and, while the fuel cell is operating in the high current density region, determining a voltage and corresponding current density; and
determining, by a processor, a diffusion resistance of the fuel cell, for example, by using a closed form solution or solving equations, using the voltage and corresponding current density, a permeation current density of the fuel cell, an exchange current density of the fuel cell, a Tafel slope of the fuel cell, a reaction order of the fuel cell, an equilibrium voltage of the fuel cell, a cell resistance of the fuel cell, a partial pressure of oxygen in a cathode of the fuel cell, and a pressure in the cathode of the fuel cell corresponding to the exchange current density.

In some embodiments, the processor determines the diffusion resistance using:

$$R_d(i) = \frac{4sFP_0}{iRT}\left(\frac{P_c}{P_0} - \left(\frac{i+i_p}{i_0}\right)^{\frac{1}{\gamma}} e^{\frac{V+ri-V_{eq}}{A\gamma}}\right)$$

wherein $R_d$ is the diffusion resistance, s is a cell area of the fuel cell, F is the Faraday constant, $P_0$ is the pressure in the cathode of the fuel cell corresponding to the exchange current density, V and i are the voltage and corresponding current density, respectively, R is the universal gas constant, T is a temperature of the fuel cell, $P_c$ is the partial pressure of oxygen in the cathode of the fuel cell, $i_p$ is the permeation current density, $i_0$ is the exchange current density, A is the Tafel slope, $\gamma$ is the reaction order, r is the cell resistance, and $V_{eq}$ is the equilibrium voltage.

In some aspects, as well as acquiring and parameterizing fuel cell polarization data in low and/or medium current density regions as described above, the method further includes:
(e) controlling operation of the fuel cell in a high current density region of a fuel cell polarization curve and, while the fuel cell is operating in the high current density region, determining a fourth voltage and corresponding fourth current density; and
(f) determining, by a processor, diffusion resistance of the fuel cell, for example, for example by using a closed form solution or solving equations, using the fourth voltage and fourth current density, a permeation current density of the fuel cell, an exchange current density of the fuel cell, a Tafel slope of the fuel cell, a reaction order of the fuel cell, an equilibrium voltage of the fuel cell, a cell resistance of the fuel cell, a partial pressure of oxygen in a cathode of the fuel cell, and a pressure in the cathode of the fuel cell corresponding to the exchange current density.

For example, the processor can determines the diffusion resistance using:

$$R_d(i) = \frac{4sFP_0}{iRT}\left(\frac{P_c}{P_0} - \left(\frac{i+i_p}{i_0}\right)^{\frac{1}{\gamma}} e^{\frac{V+ri-V_{eq}}{A\gamma}}\right)$$

wherein $R_d$ is the diffusion resistance, s is a cell area of the fuel cell, F is the Faraday constant, $P_0$ is the pressure in the cathode of the fuel cell corresponding to the exchange current density, V and i are the fourth voltage and corresponding current density, respectively, R is the universal gas constant, T is a temperature of the fuel cell, $P_c$ is the partial pressure of oxygen in the cathode of the fuel cell, $i_p$ is the permeation current density, $i_0$ is the exchange current density, A is the Tafel slope, $\gamma$ is the reaction order, r is the cell resistance, and $V_{eq}$ is the equilibrium voltage.

Embodiments of the method further include:
determining, by the processor, a partial pressure of oxygen in a cathode catalyst layer of the fuel cell using the partial pressure of oxygen in the cathode, the fourth current density, and the diffusion resistance; and re-determining, by the processor, the equilibrium voltage using the partial pressure of oxygen in the cathode catalyst layer;

iteratively re-determining, by the processor, the diffusion resistance, partial pressure of oxygen in the cathode catalyst layer, and equilibrium voltage until the diffusion resistance converges.

In some embodiments the processor determines:

(i) the partial pressure of oxygen in the cathode catalyst layer using:

$$P_{ccl} = P_c - \frac{iRTR_d}{4sF};$$

wherein $P_{ccl}$ is the partial pressure of oxygen in the cathode catalyst layer, $P_c$ is the partial pressure of oxygen in the cathode, i is the fourth current density, R is the universal gas constant, T is temperature of the fuel cell, $R_d$ is the diffusion resistance, s is cell area of the fuel cell, and F is Faraday's constant, and the equilibrium voltage using:

$$V_{eq} = 1.482 - 0.0000431 T \ln(P_{H2} P_{ccl}^{0.5})$$

wherein $P_{H2}$ is hydrogen pressure of the fuel cell and $V_{eq}$ is the equilibrium voltage.

In some aspects, as well as acquiring and parameterizing fuel cell polarization data in low and medium current density regions as described above, the method further includes:

(e) while the fuel cell is operating in a medium current density region of the fuel cell polarization curve, measuring a validation voltage and a validation current density;

(f) determining, by the processor, a predicted voltage at the validation current density, the predicted voltage predicted from the equilibrium voltage, Tafel slope, permeation current, exchange current density, cell resistance, and validation current density; and (g) comparing, by the processor, the validation voltage to the predicted voltage. For example, the processor can determine the predicted voltage using:

$$V = V_{eq} = A\ln\left(\frac{i + i_P}{i_0}\right) - ri$$

wherein V is the predicted voltage, i is the validation current density, $V_{eq}$ is the equilibrium voltage, A is the Tafel slope, $i_p$ is the permeation current density, $i_0$ is the exchange current density, and r is the cell resistance.

In some embodiments, a low current density region of a fuel cell polarization curve is within a voltage range between the open circuit voltage and 150 mV less than the open circuit voltage. In some embodiments, a medium current density region of a fuel cell polarization curve is within a voltage range between 150 mV less than the open circuit voltage of the fuel cell and 500 mV. In some embodiments, a high current density region of a fuel cell polarization curve is within a voltage range between 0 mV and 500 mV.

A supervisory control and data acquisition system for acquiring and parameterizing proton exchange membrane fuel cell polarization data includes:

a load bank for connecting electrically in series with the fuel cell;

a voltmeter for connecting electrically across the fuel cell;

an ammeter for connecting electrically in series with the load bank and the fuel cell; and a controller communicatively coupled to the load bank, the voltmeter, and the ammeter, the controller configured to operate the fuel cell at an initial cathode pressure and, while the fuel cell is operating at the initial cathode pressure.

The controller can be configured to control operation of the fuel cell and/or determine one or more polarization parameters of the fuel cell in accordance with the methods described above.

A non-transitory computer readable medium has encoded thereon computer program code that is executable by a processor and that, when executed by the processor, causes the processor to acquire and parameterize proton exchange membrane fuel cell polarization data in accordance with the methods described above. For example, it can cause a fuel cell to be operated at an initial cathode pressure and, while the fuel cell is operating at the initial cathode pressure cause the processor to determine at least one voltage and corresponding current density; and determine at least one polarization parameter of the fuel cell, for example, by using a closed form solution or solving equations, using the at least one voltage and current density.

In certain aspects, the controller may be configured to process the polarization data to determine one or more polarization parameters therefrom, even if the controller does not control operation of the fuel cell. For example, in one aspect the controller determines at least one polarization parameter of the fuel cell, for example, by using a closed form solution or solving equations, using at least one voltage and corresponding current density that have been determined independently of the controller More generally, in certain aspects the controller may determine any one or more of the polarization parameters as described herein regardless of whether the controller controls operation of the fuel cell assembly.

The fuel cell can be a fuel cell assembly, such as a single cell or a fuel cell stack comprising a plurality of fuel cells.

This summary does not necessarily describe the entire scope of all aspects. Other aspects, features, and advantages will be apparent to those of ordinary skill in the art upon review of the following description of specific embodiments.

DETAILED DESCRIPTION OF PREFERRED EMBODIMENT(S)

Figure 1:
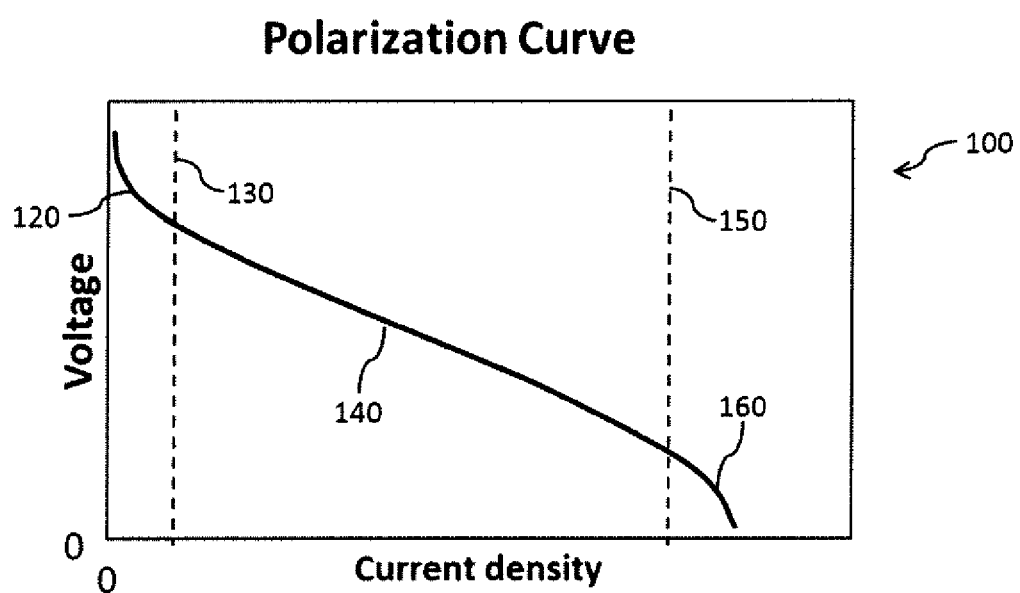
FIG. 1 illustrates a typical fuel cell polarization curve, showing fuel cell voltage versus current density.

Despite the usefulness of the fuel cell polarization curve, there are some challenges associated with obtaining the curve experimentally, and also with extracting the polarization parameters from the polarization data.

As mentioned above, one challenge with the polarization curve is related to the voltage or current set points at which the polarization data is obtained. Many data points are generally needed in order to ensure that the polarization curve is adequately captured and that a curve fit will provide accurate parameters. This can result in lengthy experiments that can take several hours for a single polarization curve.

A higher number of data points are typically required to characterize the low and high current density regimes, whereas the medium current density regime could be characterized with only a couple of data points. In order to simplify and improve the efficiency of the fuel cell testing procedures, it is desirable to be able to adequately capture the fuel cell polarization curve with a reduced or minimal set of data points. However, a practical challenge is that because the boundaries of these regions are not known prior to testing, it can be difficult to select appropriate set points so that the polarization data can be collected in an efficient manner.

The extraction of polarization parameters from fuel cell polarization data also presents some challenges. The polarization curve is a non-linear equation with many parameters that differ by several orders of magnitude. This results in parameter estimation becoming a challenging inverse problem that generally requires additional information to be obtained from further experimental test procedures and measurements in order to stabilize the solution. Information can be supplied from additional data polarization measurements, as well as from other testing techniques, such as electrochemical impedance spectroscopy (EIS) to measure membrane resistance, and linear sweep voltammetry to determine the leakage current. However, such additional test procedures and measurements add to the cost, duration and complexity of the testing, and are not always practical, for example, in an operational fuel cell system. Therefore, it is desirable to have a methodology that allows individual polarization parameters, such as leakage current and membrane resistance, to be obtained directly from the polarization data using a small or minimum number of experimental measurements.

A further challenge with existing polarization measurement and parameterization methodology is that it does not provide validation of the reliability of the polarization data from which the parameters are derived. The complexity and various operating conditions that affect a polarization curve can result in a non-reliable polarization curve. However, conventional curve fitting provides polarization parameters, regardless of the reliability of the polarization data on which it is based. This can cause discrepancies in the reported versus actual (measured) polarization parameters. It is desirable to have a methodology that is capable of self-validation as part of the same procedure, without the need to use other equipment and/or testing techniques to validate the reliability of the polarization data measurements.

Using the systems and methods described herein, fuel cell polarization parameters can be calculated from experimentally measured fuel cell polarization data. Some of the parameters can be calculated from experimentally measured fuel cell polarization data using closed form solutions that are derived from first principle equations. Embodiments of the systems and methods allow the parameters to be obtained from experimentally measured fuel cell polarization data with greater accuracy and/or more efficiently than by using conventional acquisition and curve-fitting of polarization data.

In some aspects, the present approach incorporates thermodynamic equilibrium potential, electrocatalytic kinetics, ohmic contributions, concentration contributions, and diffusion processes to capture the fuel cell dynamics. Some assumptions are made that allow effects of these processes to be decoupled, and closed form solutions to be obtained for various polarization parameters. An iterative procedure can be used to compensate or correct for errors introduced by certain assumptions that are made. A practical measurement procedure is provided that allows fuel cell polarization parameters to be calculated based on a reduced or minimal number of measured data points. Systems and methods are provided to determine the reliability of the measured polarization data and the parameters obtained therefrom.

The fuel cell polarization curve has low, medium, and high current density regions (corresponding to high, medium and low potential regions, respectively), as described above in reference to FIG. 1. Typically for PEM fuel cells, the low current density (high potential) region constitutes a range extending from the open circuit voltage to about 150 mV/cell below the open circuit voltage. Typically the high current density (low potential) region is the region below about 500 mV/cell.

In the following sections, systems and methods for capturing fuel cell polarization data and determining polarization parameters in each region are described.

Low Current Density Region (High Potential Region)

Figure 2A:
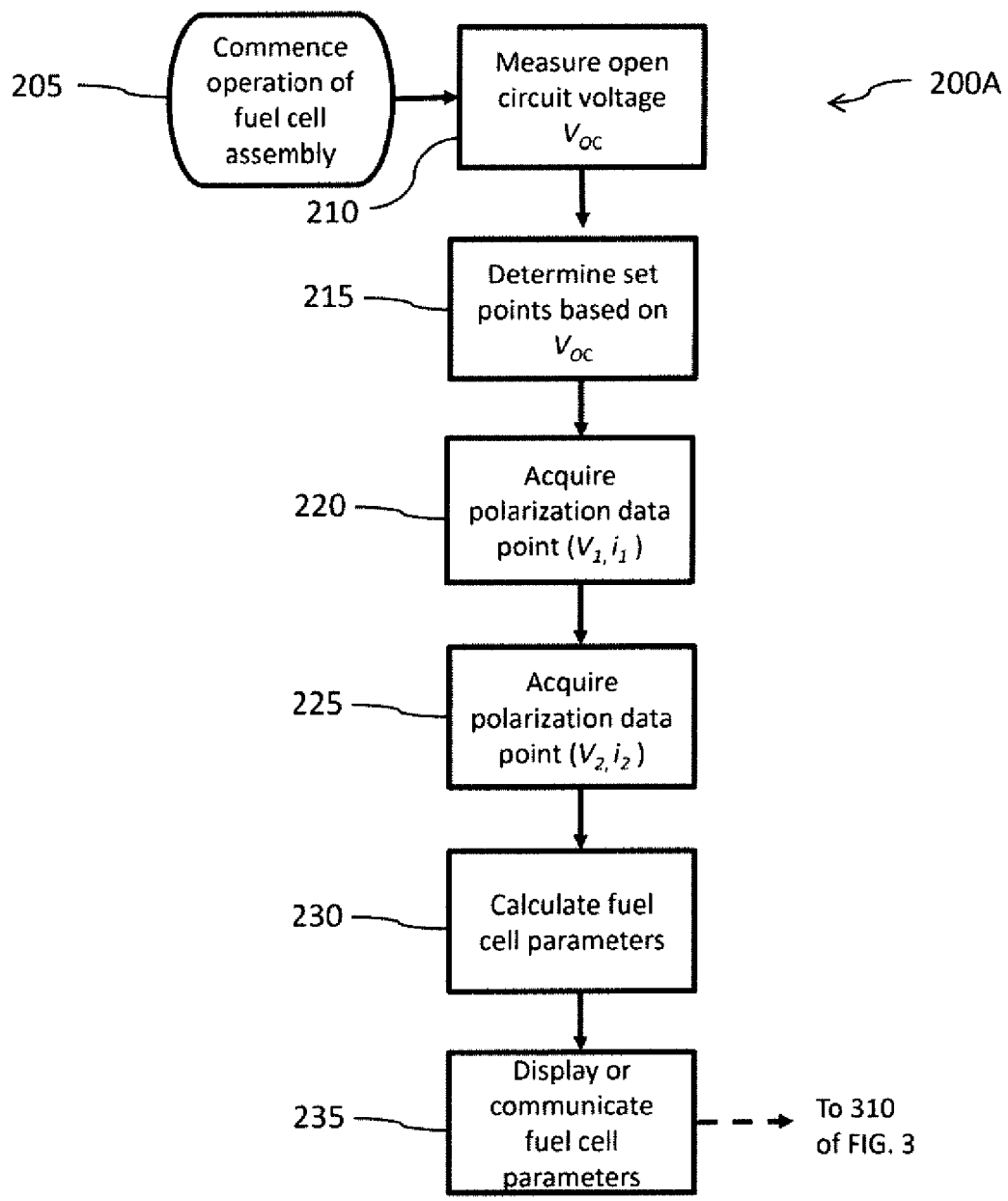
FIG. 2A is a flow chart illustrating an embodiment of a method that can be used to acquire fuel cell polarization data and determine fuel cell activation parameters for a fuel cell assembly operating in a low current density region.

FIG. 2A is a flow chart illustrating an embodiment of a method 200A that can be used to acquire fuel cell polarization data and determine fuel cell parameters in a low current density region. In particular, three activation parameters: Tafel slope A, permeation current density, $i_P$, and exchange current density, $i_0$, can be determined using method 200A.

At block 205 operation of a fuel cell assembly to be tested commences. At block 210 the open circuit voltage $V_{oc}$ of the fuel cell assembly is measured. At block 215 voltage or current set points for the acquisition of two fuel cell polarization data points in the low current density region are determined, based at least in part, on the measured open circuit voltage. For example, the set points may be selected to be at two voltages within 150 mV below the measured open circuit voltage $V_{oc}$. At block 220 a first of the two fuel cell polarization current-voltage data points $(V_1, i_1)$ is acquired with the fuel cell assembly connected to a load. Data point $(V_1, i_1)$ is acquired by measuring the current at the first voltage set point, or by measuring the voltage at the first current set point. At block 225 a second of the two fuel cell polarization current-voltage data points ($V_2$, $i_2$) is similarly acquired. At block 230 one or more fuel cell parameters are calculated using the measured values of the open circuit voltage $V_{oc}$, and the two polarization data points, ($V_1$, $i_1$) and ($V_2$, $i_2$). For example, at block 230, Tafel slope A, permeation current density, $i_P$, and exchange current density, $i_0$, can be determined by solving equations for these parameters using the measured values of $V_{oc}$, ($V_1$, $i_1$) and ($V_2$, $i_2$) in a closed form solution. The parameters can be displayed or otherwise communicated at block 235. Optionally method 200B can proceed to block 310 of the method of FIG. 3.

Elements of method 200A are described in further detail below.

In the low current density region, activation overpotentials are dominant and other sources of voltage loss are negligible. In this case, the fuel cell polarization equation can be written as shown in equation (1):

$$V = V_{eq} = A\ln\left(\frac{i+i_P}{i_0}\right) \tag{1}$$

where:
V is fuel cell voltage;
i is fuel cell current density;
$V_{eq}$ is the equilibrium potential;
A is the Tafel Slope;
$i_P$ is the permeation current density; and
$i_0$ is the exchange current density.

The equilibrium potential, $V_{eq}$, is a theoretical value and can be calculated from equation (1.1):

$$V_{eq} = 1.482 - 0.000845T + 0.0000431T\ln(P_{H2}P_{O2}^{0.5}) \tag{1.1}$$

where:
T is cell temperature;
$P_{H2}$ is hydrogen pressure; and
$P_{O2}$ is oxygen pressure.

In some embodiments of method 200A, fuel cell voltage, V, is set and current is measured. The fuel cell current, divided by the membrane electrode assembly (MEA) surface area provides fuel cell current density, r. The Tafel slope, A, the permeation current density, $i_P$, and the exchange current density, $i_0$, are calculated from measured polarization data (for example, at block 230 of method 200A) as described below.

The fuel cell open circuit voltage, $V_{oc}$, which corresponds to zero current is expressed in equation (2):

$$V_{oc} = V_{eq} - A\ln\left(\frac{i_P}{i_0}\right) \tag{2}$$

Equation (2) can be rearranged to give equation (3) where the equilibrium potential, $V_{eq}$, is expressed as a function of the open circuit voltage, $V_{oc}$, as well as the Tafel slope, A, the permeation current density, $i_P$, and the exchange current density, $i_0$.

$$V_{eq} = V_{oc} + A\ln\left(\frac{i_P}{i_0}\right) \tag{3}$$

Rewriting equation (1) with equilibrium potential, $V_{eq}$, expressed as in equation (3) results in equation (4) which can then be simplified as shown:

$$V = V_{oc} + A\ln\left(\frac{i_P}{i_0}\right) - A\ln\left(\frac{i+i_P}{i_0}\right) = V_{oc} - A\ln\left(1 + \frac{i}{i_P}\right) \tag{4}$$

In equation (4) the exchange current density, $i_0$, cancels out, and equation (4) can then be simplified as shown so that the only unknown parameters are the Tafel slope, A, and the permeation current density, $i_P$.

As described in reference to method 200A of FIG. 2A, two voltage-current data points ($V_1$, $i_1$) and ($V_2$, $i_2$) are captured in this low current density region, in addition to one at the open circuit voltage, $V_{oc}$. The method uses the values of these measurements to calculate three parameters: the Tafel slope, A, and the permeation current density, $i_P$, and the exchange current density, $i_0$.

Equation (5) shows how the calculation can be done, where $V_1$, $i_1$ and $V_2$, $i_2$ are the two measured voltage-current data points:

$$\left.\begin{array}{l}V_1 = V_{oc} - A\ln\left(1 + \frac{i_1}{i_P}\right) \\ V_2 = V_{oc} - A\ln\left(1 + \frac{i_2}{i_P}\right)\end{array}\right\} \Rightarrow \left\{\begin{array}{l}(i_1 - i_P)^a - i_P^a - i_2 i_P^{a-1} = 0 \\ a = \frac{V_2 - V_{oc}}{V_1 - V_{oc}}\end{array}\right. \tag{5}$$

To determine the two parameters, A and $i_P$, based on equation (5), the method introduces an additional parameter, a which can be determined based on $V_1$ and $V_2$. Parameter a denotes the ratio of the second voltage drop, $V_2$, from the open circuit voltage, $V_{oc}$, to the ratio of the first voltage drop, $V_1$, from open circuit voltage, $V_{oc}$.

For example, when a=2, equation (5) is a second order equation, and the permeation current density, $i_P$, can be calculated as set forth in equation (6):

$$a = 2 \Rightarrow V_1 = \frac{V_2 + V_{oc}}{2} \Rightarrow i_P = \frac{i_1^2}{i_2 - 2i_1} \tag{6}$$

This condition is satisfied when fuel cell test voltage $V_1$, is half way between fuel cell test voltage $V_2$ and the open circuit voltage, $V_{oc}$. From a single cell experimental point of view, if the fuel cell voltage is reduced from open circuit voltage, $V_{oc}$, in two equal steps, so that the a=2 condition is satisfied then, using equation (6), the permeation current density, $i_P$ can be calculated from the fuel cell current densities, $i_1$ and $i_2$, measured at those two equally spaced voltages $V_1$ and $V_2$.

Note that in case of fuel cell stacks, since the entire stack voltage is controlled as oppose to single cell voltages, it is not possible to satisfy the a=2 condition for all cells in the stack with a single measurement. In such a case, the individual cell voltages can be measured and the polynomial in equation (5) can be solved numerically to calculate the permeation current density, $i_P$, for each cell.

In some embodiments of the method, a typical value for the voltage step, so that it results in good resolution for the current and voltage measurement, while having a negligible loss due to factors other than activation, is ~50 mV/cell/step.

In other embodiments of the method, the fuel cell current is set, and the fuel cell voltage is measured, and the permeation current density, $i_P$, can be calculated from equation (5). This approach can be used, for example, if the load bank is not capable of operating in a voltage-controlled mode. A typical range for the fuel cell current density, $i_1$ and $i_2$, in this case is between 2 to 10 mA/cm².

Following the calculation of the permeation current density, $i_P$, the method involves calculating the Tafel slope, A, based on $i_P$ and the known values for either of the measured voltage-current data points ($V_1$, $i_1$ or $V_2$, $i_2$). The equations for $V_1$ or $V_2$ that are shown in equation (5) above can be re-arranged. For example, the Tafel slope, A, can be calculated from $i_P$, $V_1$, and $i_1$ as shown in equation (7):

$$A = \frac{V_{oc} - V_1}{\ln\left(1 + \frac{i_1}{i_P}\right)} \quad (7)$$

Next, the Tafel slope, A, and the permeation current density, $i_P$, (which have now been determined) can be used to solve equation (3) for the exchange current density, $i_0$, resulting in equation (8):

$$i_0 = i_P e^{\frac{V_{oc} - V_{eq}}{A}} \quad (8)$$

In summary, by measuring the fuel cell open circuit voltage, $V_{oc}$, and just two data points on the polarization curve ($V_1$, $i_1$ and $V_2$, $i_2$), along with determining the equilibrium voltage, which is calculated from temperature and pressure as shown in equation (1.1), the three activation parameters, i.e., Tafel slope A, permeation current density, $i_P$, and exchange current density, $i_0$, can be determined.

Because of the steep voltage drop in this low current density region of the polarization curve, controlling the fuel cell voltage and measuring the current will tend to result in less measurement error, compared to controlling the current and measuring the voltage. This is because small changes in current will result in large changes in voltage, while small changes in the controlled voltage will result in smaller changes in the current. Therefore, voltage-controlled measurement in the low current density or "activation" region of the polarization curve will generally result in more accurate measurement.

Another useful parameter that can be extracted from the low current density region is the reaction order, γ, which captures the effect of changes in exchange current density due to changes in cathode oxygen concentration. In order to determine reaction order, γ, some embodiments of the present methodology involve repeating the method shown in FIG. 2A with the fuel cell operating at a second cathode pressure, and determining the activation parameters at a second cathode pressure. Reaction order, γ, can then be calculated using equation 9:

$$\frac{i_0^*}{i_0} = \left(\frac{P^*}{P_0}\right)^\gamma \Rightarrow \gamma = \frac{\ln\left(\frac{i_0^*}{i_0}\right)}{\ln\left(\frac{P^*}{P_0}\right)} \quad (9)$$

where $P_0$ is the initial cathode pressure at which the exchange current density, $i_0$, is calculated, and P* is the second pressure at which the exchange current density, $i_0^*$, is calculated.

Figure 2B:
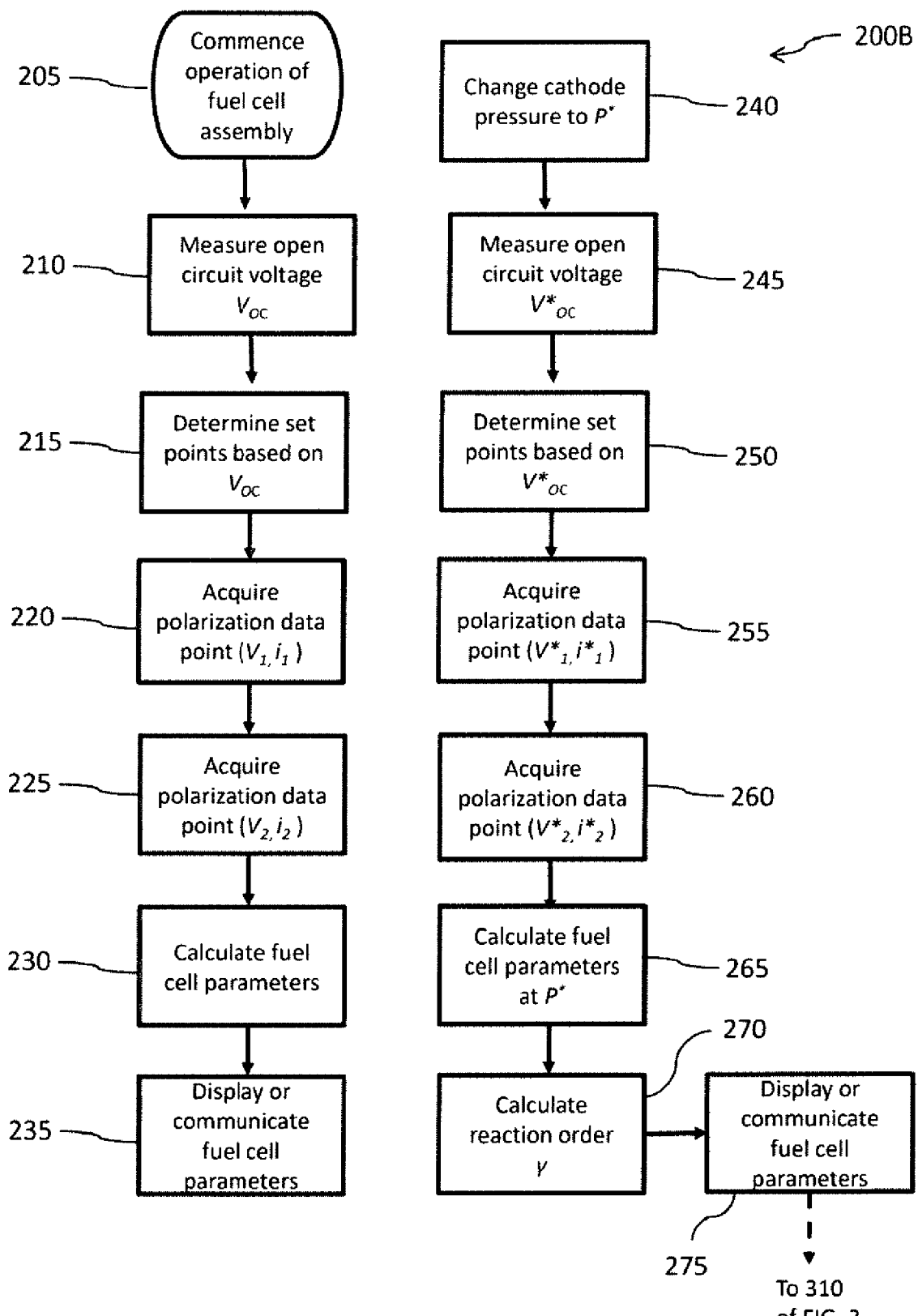
FIG. 2B is a flow chart illustrating another embodiment of a method that can be used to acquire fuel cell polarization data and determine fuel cell activation parameters for a fuel cell assembly operating in a low current density region.

FIG. 2B is a flow chart illustrating an example of a method 200B that can be used to determine reaction order, γ, as well as Tafel slope A, permeation current density, $i_P$, and exchange current density, $i_0$. Like numerals are used to indicate elements of method 200B that are essentially the same as described for method 200A. At block 240 fuel cell cathode pressure is changed to a second cathode pressure P*, and the fuel cell assembly is operated at the second cathode pressure. At block 245, the open circuit voltage $V^*_{oc}$ of the fuel cell assembly at the second cathode pressure, P*, is measured. At block 250, voltage or current set points for the acquisition of two fuel cell polarization data points in the low current density region are determined, based at least in part, on the open circuit voltage measured at block 245. Alternatively, the two set points may be the same as were used for acquisition of polarization data at the initial cathode pressure, at blocks 220 and 225. At block 255 a first of the two fuel cell polarization current-voltage data points ($V^*_1$, $i^*_1$) is acquired at the second cathode pressure, P*, by measuring current at the first voltage set point, or by measuring voltage at the first current set point. At block 260, a second of the two fuel cell polarization current-voltage data points ($V^*_2$, $i^*_2$) is similarly acquired. At block 265, one or more fuel cell parameters are calculated using the values of the open circuit voltage $V^*_{oc}$, and the two polarization data points, ($V^*_1$, $i^*_1$) and ($V^*_2$, $i^*_2$) measured at the second cathode pressure, P*, as described above. For example, at block 265, Tafel slope A, permeation current density, $i_P$, and exchange current density, $i_0$, can be determined by solving equations for these parameters using the measured values of $V_{oc}$, ($V_1$, $i_1$) and ($V_2$, $i_2$) in a closed form solution. At block 270 reaction order, γ, is calculated based on the exchange current densities determined at the two cathode pressures. The parameters can be displayed or otherwise communicated at block 275. Optionally method 200B can proceed to block 310 of the method of FIG. 3.

Medium Current Density Region (Medium Potential Region)

In the medium current density region, ohmic losses become significant and add to the activation losses. The fuel cell polarization curve in this region can be described by equation (10):

$$V = V_{eq} - A\ln\left(\frac{i + i_P}{i_0}\right) - ri \quad (10)$$

where r represents the sum of electronic and protonic resistances in the fuel cell.

The test methodology and calculations described above can be used to determine the Tafel slope A, permeation current, $i_P$, and exchange current density, $i_0$, from data points acquired in the low current density region of the polarization curve. Embodiments of the present methods then involve acquiring values for an additional voltage-current data point, ($V_3$, $i_3$) on the polarization curve. This can then be used to calculate cell resistance, r, as shown in equation (11):

$$r = \frac{V_{eq} - V_3 - A\ln\left(\frac{i_3 + i_P}{i_0}\right)}{i_3} \quad (11)$$

Figure 3:
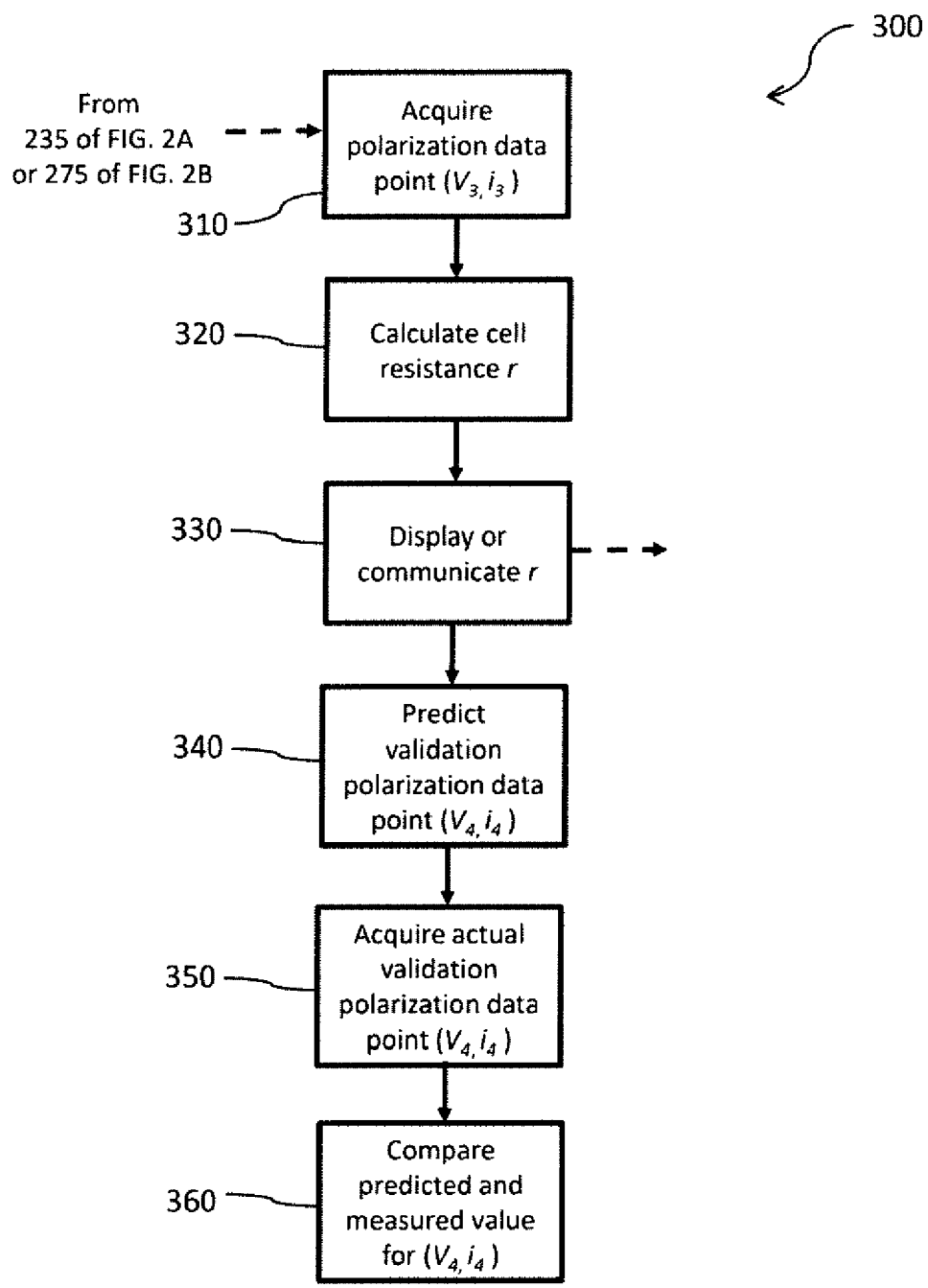
FIG. 3 is a flow chart illustrating an embodiment of a method that can be used to determine cell resistance for a fuel cell assembly operating in a medium current density region, and optionally to validate the reliability of measured polarization data.

FIG. 3 is a flow chart illustrating an embodiment of a method 300 that can be used to determine cell resistance r in the medium current density region, and optionally to validate the reliability of the measured polarization data.

Method 300 can optionally be performed in conjunction with and method 200A of FIG. 2A or method 200B of FIG. 2B.

At block 310, a fuel cell polarization data point ($V_3$, $i_3$) is acquired, by measuring current at a voltage set point, or by measuring voltage at a current set point. If method 300 is used in conjunction with method 200A or 200B, the set point in the medium current can also be determined at block 215, based at least in part, on the open circuit voltage measured at block 210. A suitable set point for this data point in the intermediate current density region of the polarization curve can generally be obtained by reducing the cell voltage, $V_3$, by an additional ~100 mV from data point, ($V_2$, $i_2$), for example.

At block 320, cell resistance r is calculated using the measured value of data point ($V_3$, $i_3$) and fuel cell parameters including Tafel slope A, permeation current density, $i_P$, and exchange current density, $i_0$, as determined using method 200A or 200B, for example. Calculated cell resistance value r can be displayed or otherwise communicated at block 330.

Given the low slope of the polarization curve in the medium current density region of the polarization curve, small changes in voltage will generally result in large changes in current, while small changes in current will result in smaller changes in voltage. Therefore, controlling the current and measuring the voltage will generally result in more accurate measurement in this region, assuming that current and voltage controllers have similar error. So once the current set point $i_3$ at the new test voltage $V_3$ in the medium current density region is obtained, then the load bank can be switched to current-control mode and use that current set point, $i_3$, to control the current and measure the respective voltage. This may further improve the accuracy of the measurement and respective polarization parameter estimation.

Again, in alternative embodiments of the present methodology, instead of setting the fuel cell voltage and measuring current, the fuel cell current can be set, and cell voltage, V, measured, in order to obtain polarization data point ($V_3$, $i_3$). In this case, the current can be changed to a nominal value between 100 to 200 mA/cm². This approach can be used, for example, if the load bank is not capable of operating in the voltage-controlled mode.

Validation

When curve fitting is used to extract polarization parameters, such parameters cannot be used to validate the reliability of the polarization data itself. However, since the above methodology uses first principle equations with closed form solutions to obtain activation and ohmic parameters, such parameters can, in turn, be used to predict other polarization points in these two regions.

Embodiments of the methods described above, use four polarization data points: $V_{OC}$, ($V_1$, $i_1$), ($V_2$, $i_2$) and ($V_3$, $i_3$), to obtain the four activation and ohmic parameters, i.e., Tafel slope A, permeation current density, $i_P$, exchange current density, $i_0$, and cell resistance, r.

A fifth polarization data point can be measured and also predicted in the ohmic region (medium current density region) using these parameters. The error between the measured and predicted value can be used to evaluate the reliability of the measured polarization data and parameters that have been calculated based on the measured polarization data.

For example, referring again to FIG. 3, at block 340 the value of a fuel cell polarization validation data point ($V_4$, $i_4$), in the medium current density region, is predicted by using the parameters determined from the measured polarization data. At 350 the value of the fuel cell polarization validation data point ($V_4$, $i_4$) is actually measured, by measuring current at a voltage set point, or by measuring voltage at a current set point.

For this data point, the cell potential can be lowered by an additional 100 mV relative to $V_3$, for example, and the cell current can be measured. Alternatively, the cell current density can be increased between 300 to 400 mA/cm², for example, in situations where the load bank cannot operate in the voltage-controlled mode At block 360 in FIG. 3, the predicted and measured values of the validation polarization data point are compared to provide an indication of the reliability of the data and parameters that have been calculated based on the measured polarization data.

High Current Density Region (Low Potential Region)

In the high current density region, substantially reduced reactant concentrations in the catalyst layer caused by mass transport limitations in diffusion media become significant and further contribute to the drop in cell voltage. These mass transport limitations, typically caused by liquid water blocking porous pathways, result in a steep decline in cell voltage which eventually drops to zero volts. While the current density at which such mass transport losses will occur is not known prior to testing, it is known that such mass transport losses will result in low cell voltages. The mass transport limiting region can be characterized by controlling the fuel cell voltage at low set point values. Nominal values for these voltages in an example fuel cell are 0.3, 0.2, and 0.1 volts. Note that the polarization mass transport limitation is typically expressed using one of two empirical formulations shown at (12):

$$B\ln\left(1 - \frac{i}{i_L}\right), me^{ni} \qquad (12)$$

where B, $i_L$, m, and n are empirical parameters that are used to capture the mass transport limitation behavior.

Since these are not first principle derivations, they do not provide fundamental understanding and quantification of the dynamic processes that contribute to mass transport losses. Curve fitting is conventionally used in to obtain good estimates for these empirical parameters.

In embodiments of the present methodology, an alternative way of modeling mass transport losses in polymer electrolyte membrane (PEM) fuel cells is used and allows a better understanding of the dynamics in this region, as described below.

The cathode is the limiting electrode in PEM fuel cells. This is because the reaction rate is orders of magnitude slower for the oxygen reduction reaction at the cathode than for the hydrogen oxidation reaction at the anode. In addition, water is produced at the cathode and effective water removal from the cathode is important to reduce flooding and associated oxygen mass transport problems. Diffusion media on the cathode side are thus more prone to flooding. Furthermore, oxygen is typically supplied by using air as the reactant stream, which results in reduced oxygen concentration in the cathode, when compared to substantially pure hydrogen which is typically supplied as the fuel stream to the anode. The cumulative effect of these issues makes the cathode the primary limiting electrode in hydrogen/air PEM fuel cells. Therefore, mass transport limitation in a PEM fuel cell can be fairly well-characterized by considering the oxygen transport dynamics at the cathode, as follows:

Equation (13) represents oxygen flow in the cathode, $Q_{O2}$, from the flow field to the cathode catalyst layer (CCL):

$$Q_{O_2} = \frac{i}{4F} = sD\frac{C_c - C_{ccl}}{d} \tag{13}$$

where:
F is the Faraday constant;
s is the cell area;
D is the oxygen diffusion coefficient in the gas diffusion layer (GDL);
$C_c$ is the oxygen concentration in the flow field; and
$C_{ccl}$ is the oxygen concentration in the cathode catalyst layer, and
d is the GDL thickness.

At steady state, oxygen flow, $Q_{O2}$, is equal to the rate of oxygen consumption. This is represented in the middle term of equation (13) by the Faraday equation.

The term on the right hand side of equation (13) represents oxygen diffusion from the cathode flow field to the cathode catalyst layer (CCL).

From the ideal gas law:

$$P = CRT$$

where:
P is the gas pressure;
C is the gas concentration;
R is the universal gas constant; and
T is the gas temperature (same as cell temperature).

Replacing this in equation (13) and rearranging gives equation (14):

$$P_{ccl} = P_c - \frac{iRTR_d}{4sF}, \quad R_d = \frac{d}{D} \tag{14}$$

where:
$P_{ccl}$ is the partial pressure of oxygen in the CCL;
$P_c$ is the partial pressure of oxygen in the cathode; and
$R_d$ is the diffusion resistance.

Changes in oxygen partial pressure in the CCL affect the exchange current density as explained by equation (9). Mass transport limitation loss is related to the effect of concentration losses in the catalyst layer, which can be captured by the effect of changes in the exchange current density using the Tafel equation, as shown in equation (15):

$$\left. \begin{array}{l} \frac{i_{0,ccl}}{i_0} = \left(\frac{P_{ccl}}{P_0}\right)^\gamma \\ V_{act+mt} = A\ln\left(\frac{i+i_P}{i_{0,ccl}}\right) \end{array} \right\} \Rightarrow V_{act+mt} = A\ln\left(\frac{i+i_P}{i_0\left(\frac{P_{ccl}}{P_0}\right)^\gamma}\right) \tag{15}$$

where:
$V_{act+mt}$ is the sum of losses due to activation and mass transport, $P_0$ is the reference pressure at which the exchange current density, $i_0$, has been calculated, and $i_{0,ccl}$ is the exchange current density at the reduced oxygen partial pressure in the cathode, $P_{ccl}$.

The right hand side of equation (15) is the Tafel equation. Since diffusion and thus concentration gradients are low in the low current density region, it can be assumed that the reference pressure, $P_0$, is equal to the cathode pressure, $P_c$, when the exchange current density, $i_0$, was calculated.

Rewriting equation (15) with $P_{ccl}$ expressed as in equation (14) results in:

$$V_{act+mt} = A\ln\left(\frac{i+i_P}{i_0\left(\frac{P_c}{P_0} - \frac{iRTR_d}{4sFP_0}\right)^\gamma}\right) \tag{16}$$

The fuel cell voltage at the mass transport region, denoted by V, can be written as:

$$V = V_{eq} - V_{act+mt} - ri = V_{eq} - A\ln\left(\frac{i+i_P}{i_0\left(\frac{P_c}{P_0} - \frac{iRTR_d}{4sFP_0}\right)^\gamma}\right) - ri$$

From this equation, the diffusion resistance, $R_d$, can be calculated as:

$$R_d(i) = \frac{4sFP_0}{iRT}\left(\frac{P_c}{P_0} - \left(\frac{i+i_P}{i_0}\right)^{\frac{1}{\gamma}} e^{\frac{V+Ri-V_{eq}}{A\gamma}}\right) \tag{17}$$

Note that the diffusion resistance is denoted by $R_d(i)$, as it depends on the fuel cell current.

All the parameters on the right hand side of equation (17) can be determined using the methods described above (for example, method 200B of FIG. 2B and method 300 of FIG. 3) or they are known values. These parameters can be used to calculate the diffusion resistance, $R_d$, at different current densities in the mass transport region.

Mass transport losses can be also separated by subtracting activation losses from equation (16):

$$V_{mt} = V_{act+mt} - V_{act} =$$

$$A\ln\left(\frac{i+i_P}{i_0\left(\frac{P_c}{P_0} - \frac{iRTR_d(i)}{4sFP_0}\right)^\gamma}\right) - A\ln\left(\frac{i+i_P}{i_0}\right) = A\ln\left(\frac{P_c}{P_0} - \frac{iRTR_d(i)}{4sFP_0}\right)^{-\gamma}$$

The full fuel cell polarization curve can be written as:

$$V = V_{eq} - A\ln\left(\frac{i+i_P}{i_0}\right) - ri - A\ln\left(\frac{P_c}{P_0} - \frac{iRTR_d(i)}{4sFP_0}\right)^{-\gamma} \tag{19}$$

Equation (19) shows the full polarization curve equation (for all three regions) obtained from this formulation An advantage of describing voltage losses in the mass transport region by an effective diffusion resistance, $R_d$, is that it represents a physical property in the fuel cell. To be more specific, the diffusion resistance, $R_d$, is the sum of gas phase diffusion resistance, $R_{d(g)}$ and liquid phase diffusion resistance, $R_{d(g)}$, as represented in equation (20):

$$R_d = R_d(g) + R_d(l) \tag{20}$$

Figure 4:
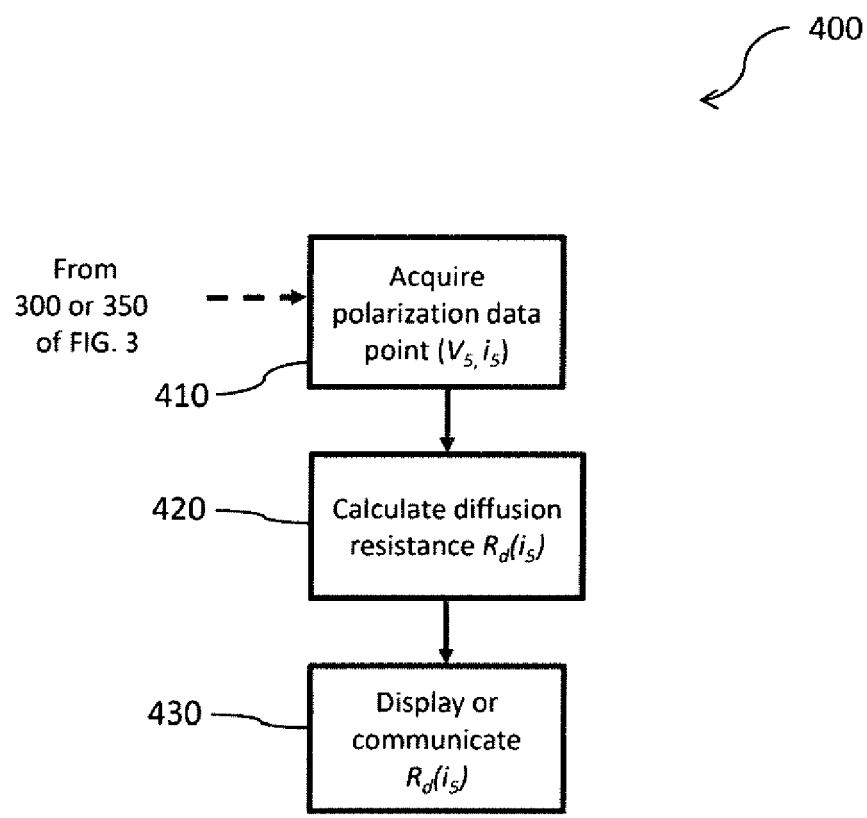
FIG. 4 is a flow chart illustrating an embodiment of a method that can be used to determine diffusion resistance at one more current densities for a fuel cell assembly operating in a high current density region.

FIG. 4 is a flow chart illustrating an embodiment of a method 400 that can be used to determine diffusion resistance, $R_d$, at one more current densities in the high current density region. Method 400 can optionally be performed in conjunction with method 300 of FIG. 3 and/or 200B of FIG. 2B.

The fuel cell assembly under test is operated in a high current density region. At block 410, a fuel cell polarization data point ($V_3$, $i_3$) is acquired, by measuring current at a voltage set point, or by measuring voltage at a current set point in the high current density region. At block 420, diffusion resistance, $R_d$, for the particular current density is calculated using fuel cell parameters (Tafel slope A, permeation current density, $i_P$, and exchange current density, $i_0$, reaction order, $\gamma$, and cell resistance r), as determined using methods 200B and 300, for example. The voltage or current of the fuel cell assembly can be adjusted within the high current density region and method 500 can be repeated to provide diffusion resistance, $R_d$, at different current densities.

An extension of the methodology described herein is to switch the cathode gas from air to a helox gas mixture and re-run the test procedures and calculations. Helox has 21% oxygen similar to air, but where the rest of the mixture is helium instead of nitrogen. This changes the gas phase diffusion resistance, $R_{d(g)}$, but does not affect the liquid phase diffusion resistance, $R_{d(l)}$. As the oxygen diffusion coefficient in helium and nitrogen is known, by obtaining the total diffusion resistances, $R_d$, for both helox and air at different current densities, it is possible to separate the gas phase and liquid phase diffusion resistance, $R_{d(g)}$, and $R_{d(g)}$, at each current density. This can provide quantitative information as what processes inhibit the transport of oxygen in the high current density region.

The steep voltage drop in the high current density (mass transport limiting) region of the polarization curve makes voltage-controlled measurement more accurate when compared to current-controlled measurement in this region, as explained above for the low current density region.

Recursive Calculation

There are certain assumptions made in the above-described methodology. One is that that ohmic losses are considered negligible in the low current density region. Another is that in mass transport region (high current density), the equilibrium potential, $V_{eq}$, is considered to be equal to that in the low and medium current density regions.

While ohmic losses are very small compared to activation losses in the low current density region, it is possible to incorporate the ohmic losses r in the formulation, once an estimate for it is obtained using the above methodology, and recalculate the activation parameters:

$$V = V_{eq} - A\ln\left(\frac{i+i_P}{i_0}\right) - ri \Rightarrow \begin{cases} (i_1 - i_P)^a - i_P^a - i_2 i_P^{a-1} = 0 \\ a = \dfrac{V_2 + ri_2 - V_{oc}}{V_1 + ri_1 - V_{oc}} \end{cases} \quad (21)$$

Using equation (21), the permeation current, $i_P$, can be calculated incorporating the ohmic loss. Subsequently, equations (7), (8), and (11) can be used to recalculate the Tafel slope, A, exchange current density, $i_0$, and the cell resistance r, respectively. This method can be iterated until the parameters converge to their corrected values.

Once the diffusion resistance, $R_d$, is calculated from equation (17) at each current density, it can be used to calculate the oxygen partial pressure in the CCL, $P_{ccl}$, from equation (14). Next, the equilibrium potential, $V_{eq}$, can be calculated using equation (1.1), by using oxygen partial pressure in the CCL, $P_{ccl}$, as the oxygen pressure, $P_{O2}$. This updated equilibrium potential, $V_{eq}$, can be used in equation (17) to provide an updated diffusion resistance, $R_d$. This procedure can be continued until the diffusion resistance, $R_d$, converges to a new value.

Figure 5:
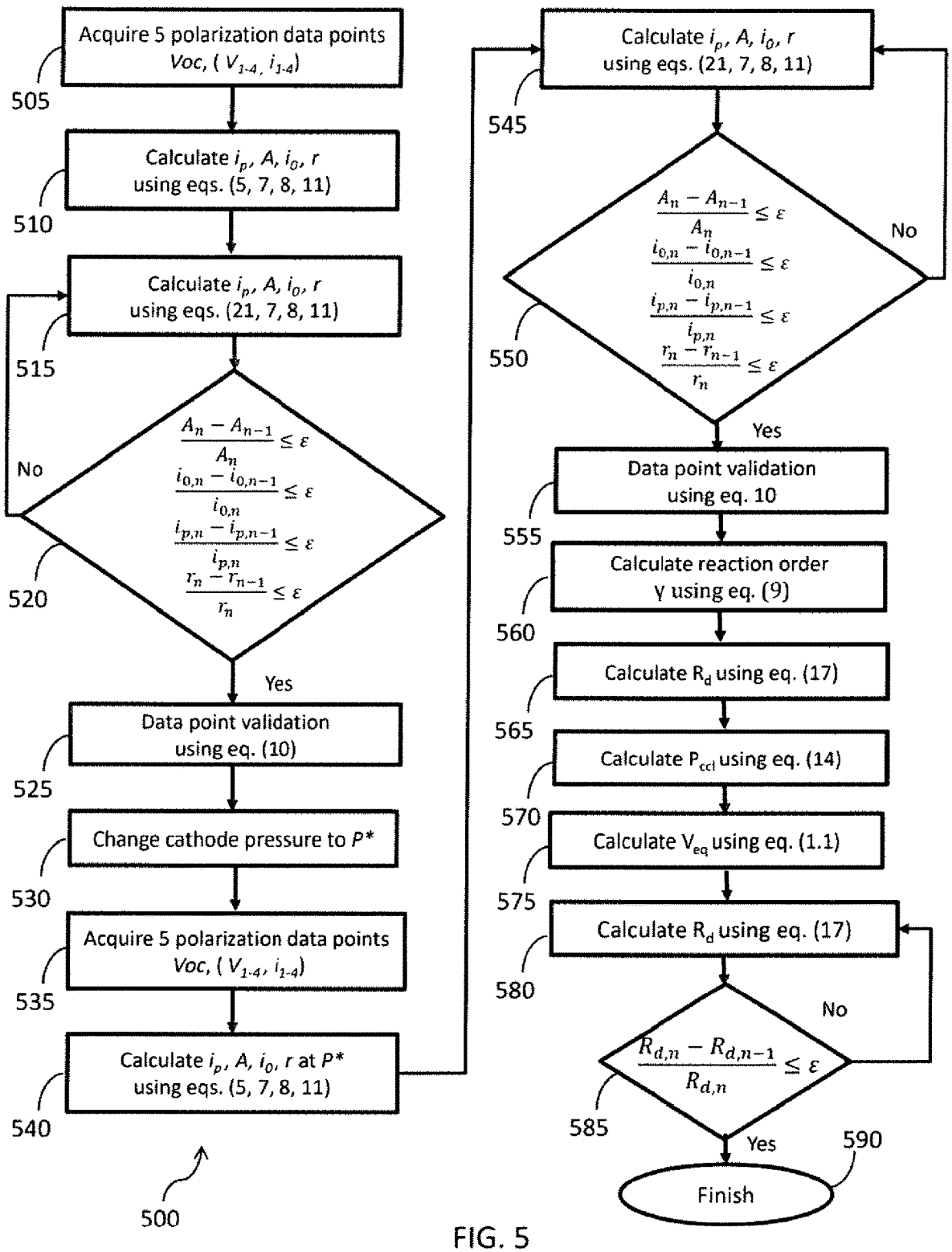
FIG. 5 is a flow chart that illustrates an embodiment of a method that uses recursive calculations in conjunction with methods to measure fuel cell data and calculate fuel cell parameters.

FIG. 5 is a flow chart that illustrates an embodiment of a method 500 that uses recursive calculations in conjunction with methods described above, to measure fuel cell data and calculate fuel cell parameters. At block 505 five fuel cell polarization data points are acquired for an operating fuel cell assembly: open circuit voltage, 2 data points in a lower current density region and 2 data points in a medium current density region. At block 510 fuel cell parameters Tafel slope, A, permeation current, $i_P$, exchange current density, $i_0$, and the cell resistance, r, are calculated using the measured data in equations as described above. At block 515, the permeation current density, $i_P$, can be calculated incorporating the ohmic loss r determined at block 510, and then equations (7), (8), and (11) can be used to recalculate the Tafel slope, A, exchange current density, $i_0$, and the cell resistance r, respectively, and this process can be iterated, as indicated at block 520, until the parameters each converge to within error threshold, $\varepsilon$. At block 525, data point validation is performed using data point ($V_4$, $i_4$), for example, as described in reference to FIG. 3. At block 530 the cathode pressure is changed to P* and the method is basically repeated, with blocks 535, 540, 545, 550 and 555 corresponding to blocks 505, 510, 515, 520 and 525, respectively. At block 560, reaction order, $\gamma$, is calculated using the exchange current densities obtained at two different cathode pressures in equation (9). At 565 diffusion, $R_d$, at a particular current density is calculated based on polarization data measured at the current density. At block 570 it is used to calculate the oxygen partial pressure in the CCL, $P_{ccl}$. Then at block 574, the equilibrium potential, $V_{eq}$, is calculated using oxygen partial pressure in the CCL, $P_{ccl}$, as the oxygen pressure, $P_{O2}$. Th updated equilibrium potential, $V_{eq}$, generated at block 575 is then used in equation (17) at block 580, to provide an updated diffusion resistance, $R_d$. This process can be iterated, as indicated at block 585, until the $R_d$ converges to within error threshold, $\varepsilon$. Method 500 ends at block 590.

FIGS. 2A to 5 are flowcharts of example embodiments of a method. Some elements (blocks) of the methods may be performed in an order other than that which is described and illustrated, or may be performed in parallel with one or more other elements, or maybe be combined with one or more other elements. Also, it should be appreciated that not all of the elements described in the flowcharts are required to be performed, that additional elements may be added, and that some of the illustrated elements may be substituted with other elements.

In the above-described methods and combinations thereof, the polarization data acquisition need not necessarily be performed by starting a low current density (high potential) and then moving to higher current density. Typically the open circuit voltage is determined initially for a particular fuel cell operating condition, as this can be used to determine appropriate current or voltage set-points for subsequent polarization data acquisition. Thereafter, polarization data can be measured and acquired at the different points in any preferred order. To the extent that some of the calculations rely on the value of parameters calculated using other equations, however, these may need to be performed in a particular sequence.

In some embodiments of the methods described herein, other techniques such as EIS (Electrochemical Impedance Spectroscopy) or Cyclic Voltammetry are used to determine some of the fuel cell parameters, and/or conventional polarization data acquisition techniques and curve-fitting is used to estimate some of the fuel cell parameters. Then the methods described herein are used to calculate other parameters based on these parameters. For example, in certain embodiments one or more parameters such as Tafel slope A, permeation current density, $i_P$, exchange current density, $i_0$, and cell resistance, r, are determined using another technique or estimated using curve-fining of fuel cell polarization data in one or both of the low current and medium density regions. These parameters are then used to determine diffusion resistance $R_d$, at current densities in the high current density region using methods as described above. As another example, in certain embodiments one or more of Tafel slope, A, permeation current density, $i_p$, and exchange current density, $i_0$, are determined using another technique or estimated using curve fitting, and those parameters are then used to determine cell resistance, r, in accordance with the methods as described above. As another example, in certain embodiments the permeation current density, $i_p$, is determined using curve fitting, and is then used to determine one or both of Tafel slope, A, and exchange current density, $i_0$.

Figure 6:
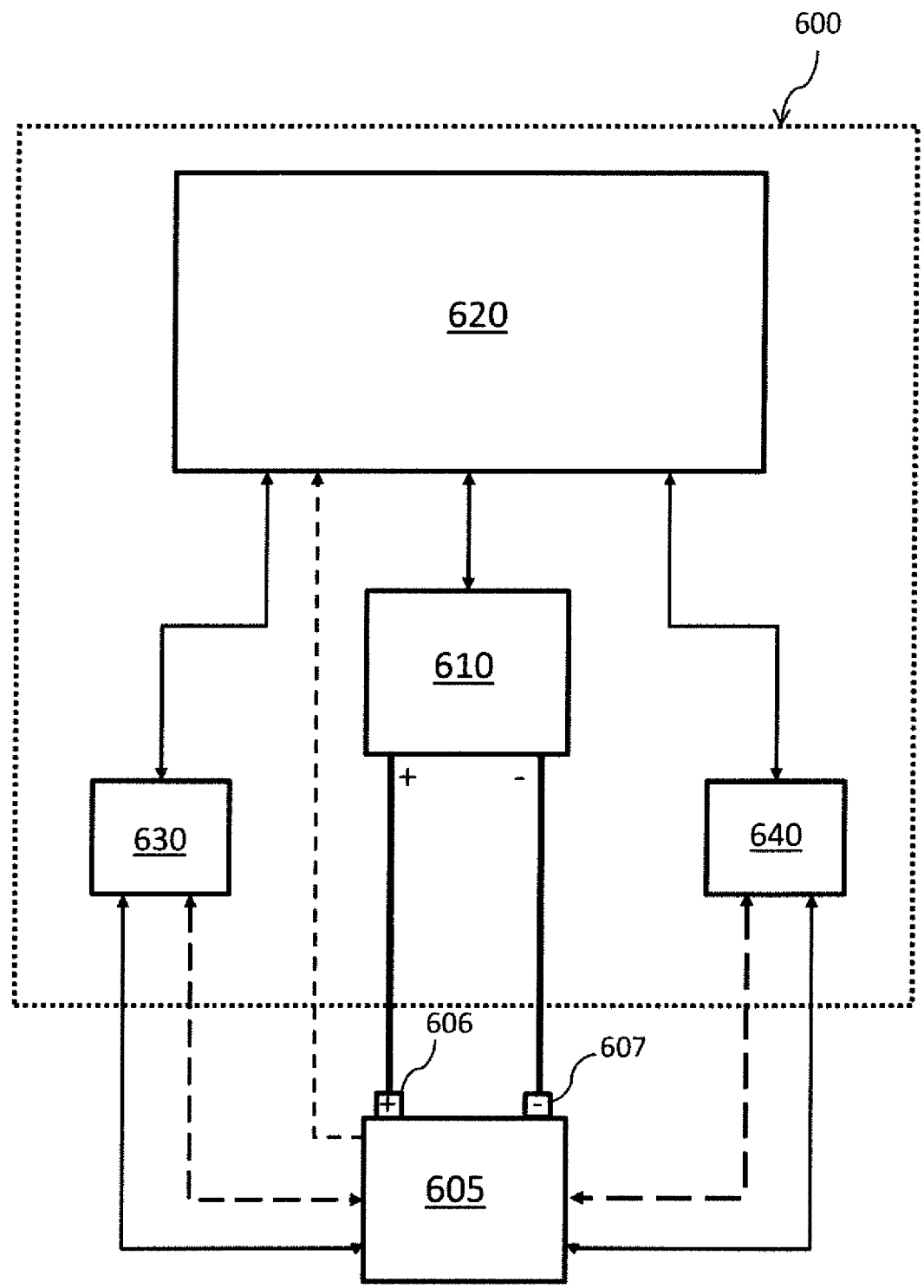
FIG. 6 is a simplified schematic diagram of a system that can be used to test and determine parameters relating to operation and performance of a fuel assembly.

FIG. 6 is a simplified schematic diagram of an embodiment of a system 600 that can be used to perform the methods described herein, in particular, to test and determine parameters relating to operation and performance of a fuel assembly 605. In FIG. 6, the long-dashed lines indicate process stream connections, the heavy solid lines indicate electrical connections, the thinner solid lines indicate measurement and control lines, and the short-dashed line indicates a measurement line.

System 600 comprises a load bank 610 and a system controller, which in the illustrated embodiment is a supervisory control and data acquisition (SCADA) system 620. Load bank 610 is capable of drawing electric power from fuel cell assembly 605. Preferably load bank 610 is capable of operating in a voltage-controlled and in a current-controlled mode. Load bank 610 is electrically connected to the positive and negative terminals 606 and 607 of a fuel cell assembly 605 that is to be tested. Fuel cell assembly 605 is connected to various subsystems including, for example, a reactant management system 630 that handles the supply of fuel and oxidant (hydrogen and air) to fuel cell assembly 605 under controlled conditions (e.g. flow rate, pressure, temperature, humidity etc.), and a thermal management subsystem 640 for regulating the temperature of fuel cell assembly 605, for example, by handling supply of a coolant to fuel cell assembly 605.

SCADA system 620 is connected and configured to control operation of fuel cell assembly 605, and its associated subsystems 630 and 640, and also to control operation of load bank 610. For example, SCADA system 620 can include a computer (e.g. a PC) running LabVIEW®-based software which communicates with 10 hardware, instruments and sensors using software and control algorithms to control and monitor operation of fuel cell assembly 605 and its associated subsystems 630 and 640, and to control and monitor the electrical load drawn from the cell or stack, including measuring current, voltage, power and/or resistance. Parameters controlled by SCADA system 620 may include, anode/cathode pressures, dew point temperatures, reactant gas inlet temperatures, fuel (hydrogen) flow rate, oxidant (air) flow rate, fuel cell assembly temperature, fuel cell/stack current, fuel cell/stack voltage, fuel cell/stack power, and/or fuel cell/stack resistance, for example. Measured operating parameters may include all of the controlled parameters (which are monitored or measured via suitable sensors and monitoring devices, for example) as well other parameters, such as, for example, individual cell voltages when fuel cell assembly 605 is a fuel cell stack comprising a plurality of fuel cells.

SCADA system 620 can be equipped to perform complex mathematical calculations in real time. In some embodiments this is achieved, for example, by interfacing a LabVIEW®-based software module with MATLAB®. In this case, LabVIEW®-based software module will collect data and control the subsystems, and the data is passed to MATLAB® for further post processing, calculation of fuel cell parameters, and determining the reliability of the obtained data.

In the depicted embodiment, the system controller comprises a processor that is communicatively coupled to a non-transitory computer readable medium. Computer program code that is executable by the processor is stored on the computer readable medium. When executed by the processor, the computer program code causes the processor (and consequently, the system controller) to perform any one or more of the embodiments of the method described herein.

In other embodiments the system controller may comprise one or more programmable logic controllers (PLCs), real-time embedded controllers (such as, for example, National Instruments CompactRIO™ platform), digital signal processors, field programmable gate arrays, or application-specific integrated circuits, which can take on aspects of the supervisory control of the system. One or more computers (e.g. PCs) can still be used to provide user interface and data acquisition capabilities. Examples of the computer readable medium are non-transitory and comprise disc-based media such as CD-ROMs and DVDs, magnetic media such as hard drives and other forms of magnetic disk storage, and semi-conductor based media such as flash media, random access memory, and read only memory.

Example

An example of above-described systems and methods was used to test an individual PEM fuel cell. The fuel cell was connected to a fuel cell test and data processing system comprising a load bank and a controller, the controller comprising a processor. For the first part of the test, the fuel cell was operated with operating conditions as presented in Table 1. The open circuit voltage, $V_{oc}$, was measured using the system, and then two data points on a polarization curve were obtained using the system by measuring current, $i_1$ and $i_2$, at two voltages, $V_1$ and $V_2$, in the high current density region, which are selected at least in part based on the measured open circuit voltage, $V_{OC}$. The controller reduced the cell voltage from the open circuit voltage, $V_{OC}$, by 50 mV for $V_1$, and by 100 mV for $V_2$. The system used the open circuit voltage, $V_{OC}$ and voltages $V_1$ and $V_2$, and corresponding measured currents r, and $i_2$, to calculate the permeation current density, Tafel slope, A, and exchange current density, $i_0$, using equations (5), 6), (7) and (8), respectively. The controller then reduced the voltage to 0.7 V and current, $i_3$, was measured at that test voltage, $V_3$ to provide a fourth data point on a polarization curve. The system used these values to calculate the cell resistance, r, using equation (11). The voltage set points that were used ($V_1$, $V_2$, and $V_3$), the current values that were measured ($i_1$, $i_2$ and $i_3$) and associated current densities for each voltage, are presented in Table 2. The parameters that were calculated by the controller based on the polarization data that was obtained by the system are presented in Table 3.

TABLE 1

Initial fuel cell operating conditions

| | |
|---|---|
| Anode pressure (kPag) | 150 |
| Anode stoichiometry | 1.5 |
| Anode humidity (° C.) | 59 |
| Anode minimum flow (NLPM) | 0.1 |
| Cathode pressure (kPag) | 150 |
| Cathode stoichiometry | 1.8 |
| Cathode humidity (° C.) | 59 |
| Cathode minimum flow (NLPM) | 0.3 |
| Cell Temperature (° C.) | 80 |

TABLE 2

Measured polarization data

| Test voltage (V) | Measured current (A) | Current density (mA/cm$^2$) |
|---|---|---|
| 0.956 (OCV) | 0 | 0 |
| 0.906 (OCV-50 mV) | 0.131 | 2.62 |
| 0.857 (OCV-100 mV) | 0.576 | 11.52 |
| 0.7 | 9.388 | 187.76 |

TABLE 3

Parameters calculated from measured polarization data

| Parameter | Value |
|---|---|
| Permeation current density, $i_p$ (mA/cm$^2$) | 1.04 |
| Tafel slope, A (V) | 0.0397 |
| Exchange current density, $i_0$ (mA/cm$^2$) | $1.99 \times 10^{-4}$ |
| Cell resistance, r (ohm/cm$^2$) | 0.27 |

Figure 7:
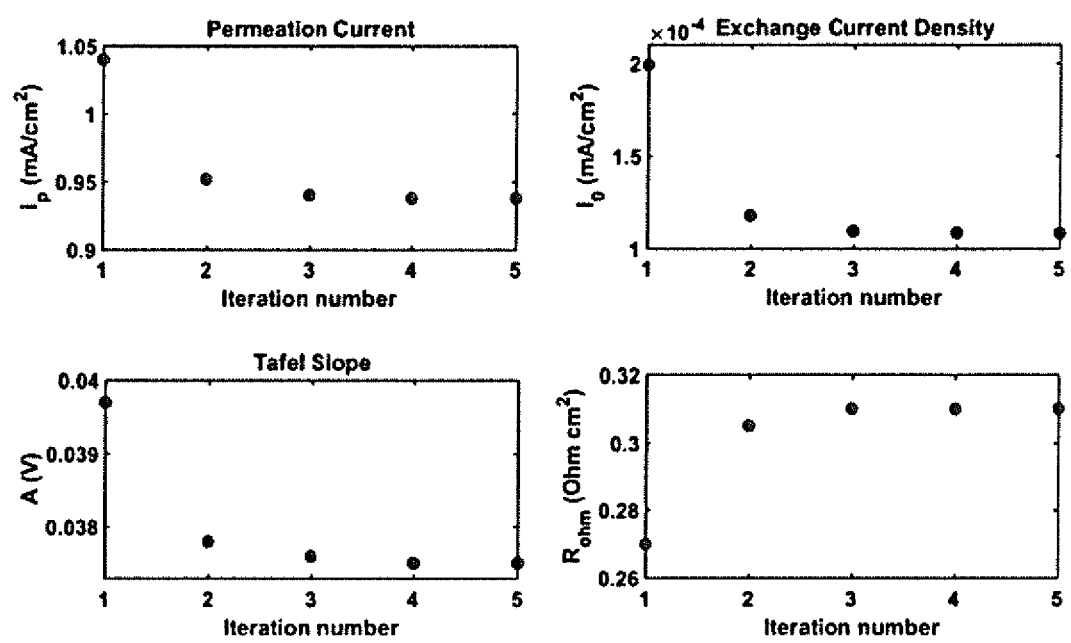
FIG. 7 is a set of graphs showing the results of re-calculation of permeation current, $i_p$, exchange current density, $i_0$, Tafel slope, A, and cell resistance, r, using a recursive procedure.

The system then used a recursive algorithm, as described above, to re-calculate the permeation current, $i_p$, Tafel slope, A, and exchange current density, $i_0$, using equations (21), (7) and (8), respectively. Error threshold, ε, was set at 1% and the convergence of these parameters to their new (more accurate) values is shown in Table 4 and graphed in FIG. 7.

TABLE 4

| Parameter | Initial values | 2$^{nd}$ iteration | 3$^{rd}$ iteration | 4$^{th}$ iteration | 5$^{th}$ iteration |
|---|---|---|---|---|---|
| Permeation current, $i_p$ (mA/cm$^2$) | 1.04 | 0.952 | 0.938 | 0.938 | 0.938 |
| Tafel slope, A (volt) | 0.0397 | 0.0378 | 0.0376 | 0.0375 | 0.0375 |
| Exchange current density, $i_0$ (mA/cm$^2$) | $1.991 \times 10^{-4}$ | $1.178 \times 10^{-4}$ | $1.095 \times 10^{-4}$ | $1.083 \times 10^{-4}$ | $1.082 \times 10^{-4}$ |
| Cell resistance, r (ohm · cm$^2$) | 0.27 | 0.303 | 0.308 | 0.309 | 0.309 |
| $\varepsilon_{max}$ | — | 40% | 7% | 1% | 0% |

The system then used data point verification, as described above, to verify the calculated parameters (permeation current, $i_p$, Tafel slope, A, exchange current density, $i_0$, and cell resistance, r. For this purpose, the controller reduced the fuel cell voltage to 0.6 V and current, $i_4$, was measured at that test voltage, $V_4$ to provide a fifth data point on a polarization curve. The parameters from Table 4 ($i_p$, A, $i_0$, r) that were determined in the first part of the testing, were then used by the system to estimate the cell voltage from the measured current, $i_4$, using the polarization equation (10), resulting in an estimated voltage of 0.607 V. This is within ~1% of the actual voltage at current $i_4$, which was 0.6 V, validating the reliability of the measured polarization data.

These results show that the systems and methods described herein can provide accurate polarization parameters from only four data points on the polarization curve. There are four important parameters in the low and medium current density regions ($i_P$, A, $i_0$, and r) and embodiments of the systems methods described herein allow them to be determined based on the measurement of just four data points on the polarization curve ($V_{oc}$, $V_1$-$i_1$, $V_2$-$i_2$, and $V_3$-$i_3$).

For the second part of the test, the controller caused the fuel cell to be operated with operating conditions as presented in Table 1, except that the cathode pressure was changed from 150 to 100 kPag. The open circuit voltage was measured using the system, and then three more data points on a polarization curve were obtained by measuring current at the same voltages, $V_1$, $V_2$ and $V_3$ as described above for the first part of the test. The system then calculated the permeation current density, $i_p$, Tafel slope, A, exchange current density, $i_0$, and cell resistance, r, based on the measured polarization data (i.e., using $V_{OC}$, $V_1$-$i_1$, $V_2$-$i_2$, and $V_3$-$i_3$) at a cathode pressure of 100 kPag, and again used a recursive algorithm to re-calculate the parameters to improve their accuracy (with ε set at 1%), as described above.

The system then used the exchange current densities calculated from data obtained at the two different cathode pressures (150 to 100 kPag) to calculate the reaction order, γ, using equation (9), resulting in a value of 4.4.

In the third part of the test, the controller continued to cause the fuel cell to be operated with operating conditions as presented in Table 1, but again with the cathode pressure at 100 kPag. The controller reduced the fuel cell voltage from 0.6 V to zero volts in 100 mV increments, and the fuel cell current was measured by the system at each of these values. The system then used the measured data to calculate the diffusion resistance, $R_d$, at each current density, using equation (17). The voltage set points, the current values that were measured for each voltage and the associated current densities, and diffusion resistance, $R_d$, values calculated by the system are shown in Table 5.

TABLE 5

Measured polarization data and calculated diffusion resistance values

| Test voltage (V) | Measured Current (A) | Current density (mA/cm$^2$) | $R_d$ |
|---|---|---|---|
| 0.501 | 32.359 | 647.2 | 0.0814 |
| 0.402 | 44.736 | 894.7 | 0.1098 |
| 0.300 | 55.891 | 1117.8 | 0.1669 |
| 0.202 | 64.99 | 1299.8 | 0.2249 |
| 0.102 | 73.385 | 1467.7 | 0.2639 |
| 0.003 | 77.804 | 1556.1 | 0.3165 |

Figure 8:
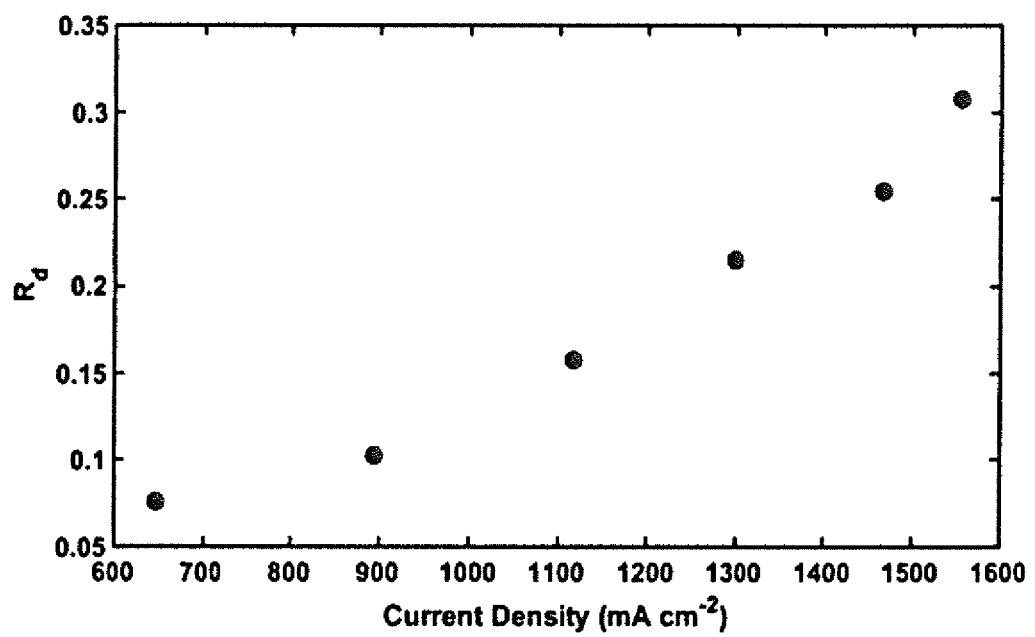
FIG. 8 is a graph showing diffusion resistance, $R_d$, values obtained at different current densities, the values calculated based on measured fuel cell polarization data, and then corrected using an iterative process.

The system used an iterative process to correct for the effect of changes in the partial pressure of oxygen in the cathode, $P_{cc}$, on the equilibrium potential, $V_{eq}$, and resulting diffusion resistance, $R_d$, using equations (14), (1.1), and (17), respectively. A convergence condition for the algorithm was set such that changes in diffusion resistance, $R_d$, were less than an error threshold of 1% ($\varepsilon=1\%$). The output of the iterative process is shown in Table 6 and the diffusion resistance, $R_d$, values that were obtained by the system are graphed in FIG. 8.

TABLE 6

| | | | | | | | |
|---|---|---|---|---|---|---|---|
| | Current density (mA/cm²) | 647.2 | 894.7 | 1117.8 | 1299.8 | 1467.7 | 1556.1 |
| | Voltage | 0.501 | 0.402 | 0.3 | 0.202 | 0.102 | 0.003 |
| | $R_d$ | 0.0814 | 0.1098 | 0.1669 | 0.2249 | 0.2639 | 0.3165 |
| 1st iteration | $P_{ccl}$ | 42.2506 | 37.7204 | 31.1625 | 24.3324 | 18.2604 | 12.0279 |
| | $V_{eq}$ | 1.2951 | 1.2942 | 1.2928 | 1.2909 | 1.2887 | 1.2855 |
| | $R_d$ | 0.0750 | 0.1021 | 0.1577 | 0.2149 | 0.2543 | 0.3080 |
| | $\varepsilon$ | 7.8% | 7% | 5% | 4.4% | 3.6% | 2.7% |
| 2nd iteration | $P_{ccl}$ | 42.2506 | 37.7204 | 31.1625 | 24.3324 | 18.2604 | 12.0279 |
| | $V_{eq}$ | 1.2951 | 1.2942 | 1.2928 | 1.2909 | 1.2887 | 1.2855 |
| | $R_d$ | 0.0750 | 0.1021 | 0.1577 | 0.2149 | 0.2543 | 0.3080 |
| | $\varepsilon$ | 0% | 0% | 0% | 0% | 0% | 0% |

Figure 9:
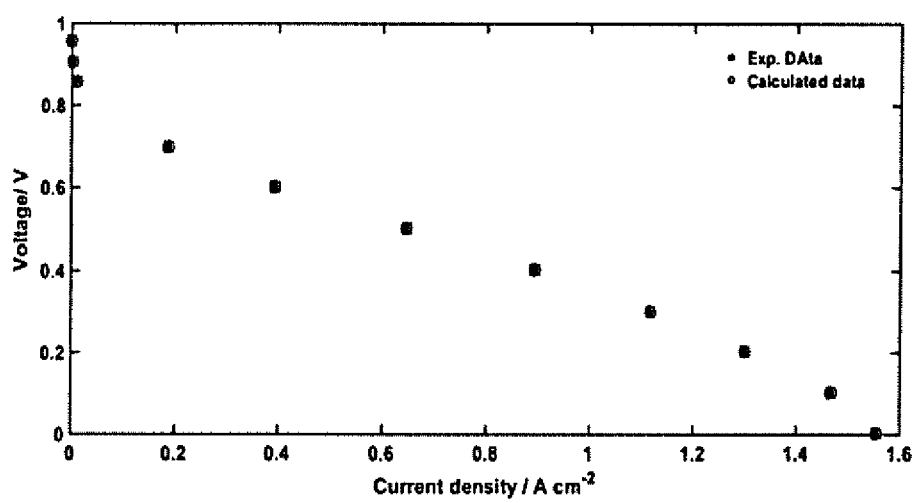
FIG. 9 is a graph showing a comparison of measured fuel cell polarization data with calculated fuel cell polarization data.

The polarization data measured using the system, as well as polarization data calculated by the system using equation (19) based on the calculated fuel cell parameters, are shown in FIG. 9. The data points are at each current density are coincident, so they are not separately visible in FIG. 9.

In some embodiments of the above-described systems and methods, the average input-output pressure in the anode and cathode is used as the respective pressure. However, in some embodiments the system can calculate the pressure profile along the cell and use that information to obtain spatial polarization parameters along the cell. This is can be specifically useful when combined with a segmented cell to provide partial information for each cell.

A modification and possible enhancement to the above described systems and methods would be to account for the doubling of the Tafel slope, A, which occurs in the medium current density regime. In some situations, this correction would likely provide a more accurate estimate of the cell resistance, r.

Conventional methods for obtaining polarization data and estimating parameters involve essentially two separate steps that are not linked—polarization data is obtained experimentally and then the parameters are estimated based on a curve fit. As a result, the experimental procedure is not modified in light of the initial data points obtained, and is therefore inefficient.

Advantages of embodiments of the systems and methods described herein may include some or all of the following:

Polarization parameters are obtained using an analytical solution which is more accurate than curve fitting.

Iterative or recursive processes can be used to further improve the accuracy of the polarization parameters that are calculated.

The number of data points needed to obtain the polarization parameters is significantly reduced or even minimized.

The mass transport (high current density) region is characterized based on physical parameters that capture transport properties in the fuel cell electrode.

Embodiments of the methods described herein can provide for more accurate voltage-current measurement by using both voltage-control and current-control modes in the acquisition of a data for a single polarization curve. For example, the system may use a voltage-control mode for acquisition of polarization data at high and low current densities, and switch to a current-control mode for acquisition of polarization data at medium current densities.

Embodiments of the systems and methods described herein are capable of validating the quality of the measured polarization data and resulting parameters, which is not possible using curve fitting methods.

Embodiments of the systems and methods described herein can be used as a diagnostic tool that can be used to characterize the fuel cell more efficiently and accurately. The systems and methods described herein are particularly directed towards testing and parameterization of PEM fuel cells operating on air and hydrogen, however the approach may be adapted for other types of fuel cells and/or reactants.

It is contemplated that any part of any aspect or embodiment discussed in this specification can be implemented or combined with any part of any other aspect or embodiment discussed in this specification.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A test method for evaluating performance of a proton exchange membrane fuel cell assembly, said test method comprising:

supplying reactants to said fuel cell assembly and measuring an open circuit voltage value of said fuel cell assembly;

using said measured open circuit voltage value to determine by a processor at least a first set point voltage or current, a second set point voltage or current, and a third set point voltage or current to be used in said test method;

while supplying reactants to said fuel cell assembly and operating said fuel cell assembly at said first set point voltage or current to produce electrical power, measuring fuel cell current at said first set point voltage or measuring fuel cell voltage at said first set point current, respectively, to obtain a first voltage-current data point;

while supplying reactants to said fuel cell assembly and operating said fuel cell assembly at said second set point voltage or current to produce electrical power, measuring fuel cell current at said second set point voltage or measuring fuel cell voltage at said second set point current, respectively, to obtain a second voltage-current data point;

while supplying reactants to said fuel cell assembly and operating said fuel cell assembly at said third set point voltage or current to produce electrical power, measuring fuel cell current at said third set point voltage or measuring fuel cell voltage at said third set point current, respectively, to obtain a third voltage-current data point;

determining at least four polarization parameters of said fuel cell assembly, wherein determining said at least four polarization parameters comprises evaluating by said processor a closed form solution using at least said measured open circuit voltage value, said first voltage-current data point, said second voltage-current data point and said third voltage-current data point; and outputting at least one indicator relating to performance of said fuel cell assembly based at least in part on at least one of said at least four polarization parameters.

2. The test method of claim 1, wherein said test method further comprises validating the reliability of said at least four polarization parameters determined in said test method by:

while supplying reactants to said fuel cell assembly and operating said fuel cell assembly to produce electrical power, measuring fuel cell current at a validation voltage or measuring fuel cell voltage at a validation current, respectively, to obtain a measured validation voltage-current data point;

determining by said processor using said at least four polarization parameters, a predicted validation voltage-current data point at said validation voltage or at said validation current;

comparing by said processor said measured validation voltage-current data point to said predicted validation voltage-current data point;

outputting an indicator of the reliability of said at least four polarization parameters determined in said test method, based on the difference between said measured validation voltage-current data point and said predicted validation voltage-current data point.

3. The test method of claim 1, wherein said at least four polarization parameters of said fuel cell assembly comprise Tafel slope, permeation current density, exchange current density and cell resistance.

4. The test method of claim 1, wherein:

said measured open circuit voltage value is used to determine, by said processor, at least a first set point voltage and a second set point voltage to be used in said test method;

while supplying reactants to said fuel cell assembly and operating said fuel cell assembly at said first set point voltage to produce electrical power, fuel cell current is measured at said first set point voltage to obtain said first voltage-current data point; and while supplying reactants to said fuel cell assembly and operating said fuel cell assembly at said second set point voltage to produce electrical power, fuel cell current is measured at said second set point voltage to obtain said second voltage-current data point.

5. The test method of claim 4, wherein said first and second voltage-current data points are in a low current density region in which the fuel cell voltage is within a voltage range between said measured open circuit voltage value and about 150 mV per cell below said measured open circuit voltage value.

6. The test method of claim 4 wherein said first set point voltage and set second set point voltage are within a voltage range between said measured open circuit voltage value and 150 mV per cell below said measured open circuit voltage value.

7. The test method of claim 6 wherein said first set point voltage is about 50 mV per cell below said measured open circuit voltage value and said second set point voltage is about 100 mV per cell below said measured open circuit voltage value.

8. The test method of claim 6 wherein said measured open circuit voltage value is used to determine by said processor a third set point voltage to be used in said test method, and said third set point voltage is about 100 mV per cell below said second set point voltage.

9. The test method of claim 1, wherein:

said measured open circuit voltage value is used to determine, by said processor, at least a first set point voltage, a second set point voltage and a third set point current to be used in said test method;

while supplying reactants to said fuel cell assembly and operating said fuel cell assembly at said first set point voltage to produce electrical power, fuel cell current is measured at said first set point voltage to obtain said first voltage-current data point;

while supplying reactants to said fuel cell assembly and operating said fuel cell assembly at said second set point voltage to produce electrical power, fuel cell current is measured at said second set point voltage to obtain said second voltage-current data point; and while supplying reactants to said fuel cell assembly and operating said fuel cell assembly at said third set point current to produce electrical power, fuel cell voltage is measured at said third set point current to obtain said third voltage-current data point.

10. The test method of claim 9, wherein said first and second voltage-current data points are in a low current density region in which the fuel cell voltage is within a voltage range between said measured open circuit voltage value and about 150 mV per cell below said measured open circuit voltage value, and wherein said third voltage-current data point is in a medium current density region in which the fuel cell voltage is within a voltage range between about 150 mV less than the open circuit voltage of the fuel cell and about 500 mV.

11. The test method of claim 9, wherein said test method further comprises validating the reliability of said at least four polarization parameters determined in said test method by:

while supplying reactants to said fuel cell assembly and operating said fuel cell assembly to produce electrical power, measuring fuel cell current at a validation voltage or measuring fuel cell voltage at a validation current, respectively, to obtain a measured validation voltage-current data point;

determining by said processor using said at least four polarization parameters, a predicted validation voltage-current data point at said validation voltage or at said validation current;

comparing, by said processor, said measured validation voltage-current data point to said predicted validation voltage-current data point;

outputting an indicator of the reliability of said at least four polarization parameters determined in said test method, based on the difference between said measured validation voltage-current data point and said predicted validation voltage-current data point.

12. The test method of claim 11, wherein said at least four polarization parameters of said fuel cell assembly comprise Tafel slope, permeation current density, exchange current density and cell resistance.

13. The test method of claim 11 wherein:

while supplying reactants to said fuel cell assembly and operating said fuel cell assembly to produce electrical power, fuel cell voltage is measured at a validation current, respectively, to obtain said measured validation voltage-current data point.

14. The test method of claim 13, wherein said first and second voltage-current data points are in a low current density region in which the fuel cell voltage is within a voltage range between said measured open circuit voltage value and about 150 mV per cell below said measured open circuit voltage value, and wherein said third voltage-current and said measured validation voltage-current data point are in a medium current density region in which the fuel cell voltage is within a voltage range between about 150 mV less than the open circuit voltage of the fuel cell and about 500 mV.

15. A system configured to carry out a test method as claimed in claim 1, wherein said system is a supervisory control and data acquisition system, said system comprising:
   a reactant supply subsystem for supplying fuel and oxidant to a proton exchange membrane fuel cell assembly;
   a load bank for connecting electrically in series with said fuel cell assembly;
   a voltmeter for connecting electrically across said fuel cell assembly;
   an ammeter for connecting electrically in series with said load bank and said fuel cell assembly;
   a processor;
   a controller communicatively coupled to said reactant supply subsystem, load bank, said voltmeter, said ammeter, and said processor, said controller configured:
      to cause said reactant supply subsystem to supply reactants to said fuel cell assembly and, while said reactants are being supplied to said fuel cell assembly, to measure by said voltmeter an open circuit voltage value of said fuel cell assembly;
      to cause said processor to determine, using said measured open circuit voltage value, at least a first set point voltage or current, a second set point voltage or current, and a third set point voltage or current to be used in said test method;
      to cause said reactant supply subsystem to supply reactants to said fuel cell assembly, and to cause said load bank to be connected to receive electrical power from said fuel cell assembly, and to cause said fuel cell assembly to operate at said first set point voltage or current to provide electrical power to said load bank and, while said fuel cell assembly is operating at said first set mint voltage or current, to measure by said ammeter a first fuel cell current or to measure by said voltmeter a first fuel cell voltage, respectively, for obtaining a first voltage-current data point;
      to cause said reactant supply subsystem to supply reactants to said fuel cell assembly, and to cause said load bank to be connected to receive electrical power from said fuel cell assembly, and to cause said fuel cell assembly to operate at said second set point voltage or current to provide electrical power to said load bank and, while said fuel cell assembly is operating at said second set point voltage or current to measure by said ammeter a second fuel cell current or to measure by said voltmeter a second fuel cell voltage, respectively, for obtaining a second voltage-current data point;
      to cause said reactant supply subsystem to supply reactants to said fuel cell assembly, and to cause said load bank to be connected to receive electrical power from said fuel cell assembly, and to cause said fuel cell assembly to operate at said third set point voltage or current to provide electrical power to said load bank and, while said fuel cell assembly is operating at said third set point voltage or current to measure by said ammeter a third fuel cell current or to measure by said voltmeter a third fuel cell voltage, respectively, for obtaining a third voltage-current data point;
      to cause said processor to determine at least four polarization parameters of said fuel cell assembly at least in part by evaluating a closed form solution using at least said measured open circuit voltage value, said first voltage-current data point, said second voltage-current data point and said third voltage-current data point; and
      to output at least one indicator relating to performance of said fuel cell assembly based at least in part on at least one of said at least four polarization parameters.

16. The system of claim 15, said system further configured to validate the reliability of said at least four polarization parameters, wherein said controller is further configured:
   to cause said reactant to supply reactants to said fuel cell assembly, and to cause said load bank to be connected to receive electrical power from said fuel cell assembly, and to cause said fuel cell assembly to operate at a validation voltage or current to provide electrical power to said load bank and, while said fuel cell assembly is operating at said validation voltage or current, to measure by said ammeter a validation fuel cell current or to measure by said voltmeter a validation fuel cell voltage, respectively, to obtain a measured validation voltage-current data point;
   to cause said processor to determine using said at least four polarization parameters a predicted validation voltage-current data point at said validation voltage or at said validation current, and to compare said measured validation voltage-current data point to said predicted validation voltage-current data point; and
   to output an indicator of the reliability of said at least four polarization parameters, based on the difference between said measured validation voltage-current data point and said predicted validation voltage-current data point.

17. A non-transitory computer readable medium having encoded thereon computer program code that is executable by a processor and that, when executed by said processor, causes said processor:
   to cause a controller to supply reactants to a proton exchange membrane fuel cell assembly and, while said reactants are being supplied to said fuel cell assembly, to measure an open circuit voltage value of said fuel cell;
   to determine, using said measured open circuit voltage value, at least a first set point voltage or current, a second set point voltage or current and a third set point voltage or current to be used in said test method;
   to cause said controller to supply reactants to said fuel cell assembly and operate said fuel cell assembly at said first set point voltage or current to produce electrical power and, while said fuel cell assembly is operating at said first set point voltage or current, to measure a first fuel cell current or voltage, respectively, to obtain a first voltage-current data point;
   to cause said controller to supply reactants to said fuel cell assembly and operate said fuel cell assembly at said second set point voltage or current to produce electrical power and, while said fuel cell assembly is operating at said second set point voltage or current, to measure a second fuel cell current or voltage, respectively, to obtain a second voltage-current data point;

to cause said controller to supply reactants to said fuel cell assembly and operate said fuel cell assembly at said third set point voltage or current to produce electrical power and, while said fuel cell assembly is operating at said third set point voltage or current, to measure a third fuel cell current or voltage, respectively, to obtain a third voltage-current data point;

to determine at least four polarization parameters of said fuel cell assembly by evaluating a closed form solution using at least said measured open circuit voltage value, said first voltage-current data point, said second voltage-current data point and said third voltage-current data point; and to output at least one indicator relating to performance of said fuel cell assembly based at least in part on at least one of said at least four polarization parameters.

18. The non-transitory computer readable medium of claim 17 wherein said computer program code when executed by said processor, further causes said processor:

to cause a controller to supply reactants to said fuel cell assembly and operate said fuel cell assembly at a validation voltage or current and, while said fuel cell assembly is operating at said validation voltage or current, to measure a validation fuel cell current or a validation fuel cell voltage, respectively, to obtain a measured validation voltage-current data point;

to determine using said at least four polarization parameters a predicted validation voltage-current data point at said validation voltage or at said validation current, and to compare said measured validation voltage-current data point to said predicted validation voltage-current data point; and to output an indicator of the reliability of said at least four polarization parameters, based on the difference between said measured validation voltage-current data point and said predicted validation voltage-current data point.

* * * * *